(12) United States Patent  (10) Patent No.: US 9,203,730 B1
Johnson et al.  (45) Date of Patent: Dec. 1, 2015

(54) METHOD AND APPARATUS FOR TESTING NETWORK INTERFACES

(71) Applicant: Sifos Technologies, Inc., Tewksbury, MA (US)

(72) Inventors: Peter G. Johnson, Andover, MA (US); John H. Skinner, Billeria, MA (US); Kendrick R. Bennett, Tewksbury, MA (US)

(73) Assignee: Sifos Technologies, Inc., Tewksbury, MA (US)

( * ) Notice: Subject to any disclaimer, the term of this patent is extended or adjusted under 35 U.S.C. 154(b) by 336 days.

(21) Appl. No.: 13/798,422

(22) Filed: Mar. 13, 2013

Related U.S. Application Data

(60) Provisional application No. 61/727,965, filed on Nov. 19, 2012.

(51) Int. Cl.
*H04J 3/16* (2006.01)
*H04L 12/26* (2006.01)
(52) U.S. Cl.
CPC ........................ *H04L 43/50* (2013.01)
(58) Field of Classification Search
CPC ............... H04J 2203/0085; H01I 12/2881; H04L 45/66; H04L 49/351; H04L 49/352; H04L 49/604; H04L 2012/445; H04L 2012/6454; H04Q 11/0067
See application file for complete search history.

(56) References Cited

U.S. PATENT DOCUMENTS

| | | | |
|---|---|---|---|
| 6,813,777 B1* | 11/2004 | Weinberger et al. | 725/76 |
| 7,546,499 B1* | 6/2009 | Shafer et al. | 714/725 |
| 7,627,398 B1 | 12/2009 | Bennett et al. | |
| 2002/0123350 A1* | 9/2002 | Bui | 455/450 |
| 2005/0052189 A1* | 3/2005 | Christensen | 324/622 |
| 2007/0011547 A1* | 1/2007 | Karam | 714/746 |
| 2007/0081553 A1* | 4/2007 | Cicchetti et al. | 370/466 |
| 2009/0052509 A1* | 2/2009 | Agazzi | 375/219 |
| 2010/0211664 A1* | 8/2010 | Raza et al. | 709/223 |
| 2011/0001833 A1* | 1/2011 | Grinkemeyer et al. | 348/192 |
| 2011/0095767 A1* | 4/2011 | Motter et al. | 324/539 |
| 2013/0229926 A1* | 9/2013 | Lu et al. | 370/249 |
| 2014/0330533 A1* | 11/2014 | Gadlage et al. | 702/120 |

* cited by examiner

*Primary Examiner* — Jung-Jen Liu
(74) *Attorney, Agent, or Firm* — Chapin IP Law, LLC

(57) ABSTRACT

Methods and apparatus provide for a system to measure transceiver parameters and test network interfaces at a physical layer without requiring specialized interface fixtures and excessive preparation and intervention.

20 Claims, 19 Drawing Sheets

METHOD AND APPARATUS FOR TESTING NETWORK INTERFACES

This application claims the benefit of the filing date of earlier filed pending United States to Provisional Patent Application having Ser. No. 61/727,965, filed Nov. 19, 2012, and entitled "METHOD AND APPARATUS FOR TESTING NETWORK INTERFACES." The entire teachings and contents of this Provisional Patent Application are hereby incorporated by reference herein in their entirety.

FIELD OF THE INVENTION

This invention relates generally to instrumentation for parametric, physical layer interface testing of network products including network interfaces.

BACKGROUND

The IEEE 802.3 specified twisted pair Ethernet physical interfaces 10Base-T (10 Mbps "Ethernet"), 100Base-Tx (100 Mbps "Fast Ethernet"), and 1000Base-T (1000 Mbps "Gigabit Ethernet") are well established and widely deployed technologies supporting high speed computer internetworking in local area networks. The popularity of these interfaces is related to the abundance of low cost and easily installed structured cabling components utilized to provide connectivity between networked devices.

1000Base-T, and to a lesser extent, 100Base-Tx, employ sophisticated physical (electrical) layer signaling schemes that require high speed, real-time digital signal processing technology to produce and to decode signals transmitted on twisted pair cabling. Additionally, all 10/100/1000Base-T interfaces rely on isolation and common mode suppression transformers and high bandwidth, impedance matched circuit connections.

While data transmission performance of a network interface is very much dependent upon the integrity and performance of each 10/100/1000Base-T interface (port) at the physical layer, the relationship is typically obscured by many other factors such as connection distance, cabling and connection environments, physical layer error correction capability (1000Base-T), and internet packet re-transmission protocols at higher network layers.

Assessing the physical layer performance characteristics of a 10/100/1000Base-T port independent of these other factors conventionally requires very specialized test setups and measurements that are historically very distinct from ordinary connection and usage of that interface. More specifically, IEEE 802.3 specifications dictate test methods involving high speed digital oscilloscopes, high bandwidth active differential probes, specialized measurement interfaces or fixtures, specialized transceiver device test modes, as well as other forms of electronic test equipment. IEEE 802.3 test methods are focused mainly on transmitter and interface characteristics and are less specific about receiver testing. The testing described is typically performed on a single transmitting wire pair meaning that two independent sets of test data (MDI, MDI-X) must be gathered for 100Base-Tx interfaces and four independent sets of test data (Pairs A, B, C, and D) must be gathered for 1000Base-T interfaces. High speed oscilloscope measurements performed in the time domain require careful attention to interface fixtures, oscilloscope probe characteristics and calibrations, and to oscilloscope channel calibrations.

Several producers of high speed digital oscilloscopes do offer semi-automated "scope-ware" solutions and pre-fabricated test fixtures to facilitate testing of 100Base-Tx and 1000Base-T transmitted signal characteristics. These solutions help with the oscilloscope configuration and test data collection aspects of certain 802.3 measurements. However, they do not address core metrology issues such as probe characterization, probe accuracy, fixture calibration, and calibration references. Users of those systems must address all of those issues of absolute measurement accuracy independently.

Because of the cost and complexity of traditional physical layer testing methods and solutions, many producers of products with one or more Ethernet ports rely on functional link verification or packet transmission verification types of testing. These methods offer plug-and-play connectivity and are much easier to perform. However, they offer very limited parametric insight meaning they cannot assure tested devices will perform properly under all network interface conditions.

As a general matter in digital communication systems, the assessment of receiver performance is a challenging task owing to the need to precisely simulate incoming signals while capturing the outcome of receiver decisions through a direct interface to the decision making entity. Signal simulation is important because receiver testing is ideally carried out with signals that range to the specified input tolerances of a receiver in areas such as signal amplitude, frequency and phase response characteristics, noise content, symbol timing variation, and so on. A well-known digital receiver measurement, bit error ratio or BER, then characterizes the probability of the receiver misinterpreting information at the most fundamental level, that is, the level of bits in a bit stream.

In a prolific and integrated technology such as 10/100/1000Base-T Ethernet, receivers are generally embedded within highly integrated transceiver devices where available information conveying receiver decision performance is not directly available. Consequently, measurements of receiver performance are carried out at the Ethernet packet level where packets that carry many hundreds of bits are deemed either valid or erred in reference to check sum values that are also embedded in those same packets. Erred packets thus create the ambiguity of one to many possible bit errors per packet. Packet flow testing is often restricted to devices with two or more bridged Ethernet ports since packets flowing into the receiver-under-test must then be forwarded back to a packet counting device using a second Ethernet port.

Similarly, signal simulation is impractical in the testing of 100Base-T and 1000Base-T receivers owing to the fact that these are not simple binary signals and that they must comply with complex physical layer signaling protocols in order to establish and maintain a link with another Ethernet interface. Furthermore, commercially available solutions for controlled signal degradation or impairment applicable to 10/100/1000Base-T technology are, rare, poorly characterized, limited in function, and/or expensive.

The task of parametrically testing twisted pair Ethernet interfaces such as 100Base-Tx and 1000Base-T at the physical or electrical signaling, layer using conventional means has been expensive, laborious, and invasive, often defying highly automated approaches. For this reason, the common practice in the network equipment industry has been to rely solely on functional "go/no-go" and functional packet loss testing to qualify interface performance.

SUMMARY

Configurations disclosed herein substantially overcome the shortcomings of conventional testing systems. In particular, a 10/100/1000Base-T physical layer test solution as disclosed herein provides a true plug-and-play device without requiring specialized interface fixtures and excessive preparation and intervention to place Ethernet transceivers into specialized test modes defined in IEEE 802.3 standards. Testing is fully automated and functions on a 10/100/1000Base-T interface capable of linking to another 10/100/1000Base-T interface. Testing includes both transmitter and receiver performance characteristics. Automation allows sampling of many Ethernet ports on multi-port devices including Ethernet switches and routers.

Embodiments described herein provide a different approach to address parametric testing of 10Base-T "Ethernet", 100Base-Tx "Fast Ethernet", and 1000Base-T "Gigabit Ethernet" interfaces at the physical layer. Example embodiments enable "plug'n play", highly automated physical layer performance analysis of Base-T transceivers with coverage of transmitter, interface, and receiver performance characteristics. Additionally, embodiments can test "finished product" interfaces and are not reliant on invasive connections or specialized test modes. Similarly, these embodiments can analyze Ethernet signal quality and performance at any service access point in a wired network in order to qualify remote connections.

A technique to test electrical characteristics of a port-under-test, the method includes establishing a communication link using a test cable between the port-under-test and a test port, having a medium dependent interface (MDI) and an integrated transceiver having a diagnostic digital receiver, configuring the diagnostic digital receiver, probing at least one diagnostic digital receiver signal on at least one wire pair in real time, processing the at least one probed diagnostic digital receiver signal into a measurement, adjusting the measurement using a predetermined calibration and comparing the adjusted measurement to a predetermined standard. In one embodiment the characteristics include transmission characteristics. Such a technique provides a method for parametric testing of 10Base-T, 100Base-Tx, and 1000Base-T interfaces at the physical layer without requiring specialized interface fixtures.

In a further embodiment configuring the diagnostic digital receiver includes establishing a predetermined receiver gain, probing at least one diagnostic digital receiver signal includes probing a received digital signal, processing the at least one probed diagnostic digital receiver signal into a measurement includes computing signal power of the at least one probed diagnostic digital receiver signal averaged over a predetermined time interval, adjusting the measurement includes removing from the computed signal power a predetermined power loss attributable to the test cable, to the medium dependent interface, and to the diagnostic digital receiver and comparing the adjusted measurement includes comparing the adjusted measurement of computed signal power to a predetermined power level. Such a technique enables the measurement of wideband signal power.

In a further embodiment, the port-under-test includes an ideal transmitter transmitting nominal power signals on at least one wire pair, and further comprising retaining the measurement as a calibration of predetermined power loss attributable to the test cable, the medium dependent interface, and the diagnostic digital receiver. Such a technique enables calibration of the wideband signal power measurement.

In a further embodiment, configuring the diagnostic digital receiver includes establishing a predetermined receiver gain, probing the at least one diagnostic digital receiver signal includes probing a received digital signal and a reproduced digital signal at a plurality of symbol interval offsets. Processing the at least one probed diagnostic digital receiver signal into a measurement includes computing correlation power averaged over a predetermined time interval for each of the plurality of symbol interval offsets to produce an inter-symbol interference measurement, convolving the inter-symbol interference measurement with a plurality of constant amplitude sine waves to produce a power-frequency spectrum. The technique further includes adjusting the measurement by removing from the power-frequency spectrum a predetermined power-frequency spectrum attributable to the test cable, the medium dependent interface, and the diagnostic digital receiver, and comparing the adjusted measurement includes comparing the adjusted measurement to a power frequency spectrum corresponding approximately to an ideal transmitted signal. Such a technique enables the measurement of power spectral distortion.

Another embodiment includes configuring a second different test port to be a calibration test port configured with a nominal power-frequency spectrum. The port-under-test is the calibration test port, and retains the inter-symbol interference measurement attributable to the test cable, to the medium dependent interface, and to the diagnostic digital receiver as a calibration. Such a technique enables calibration of the power spectral distortion measurement.

In a further embodiment, configuring the diagnostic digital receiver includes establishing a predetermined receiver gain, probing the at least one diagnostic digital receiver signal includes probing a corrected digital signal and a reproduced digital signal, processing the at least one probed diagnostic digital receiver signal into a measurement includes computing power of the corrected digital signal and the reproduced digital signal averaged over a predetermined time interval, adjusting the measurement includes removing a predetermined noise power level attributable to the diagnostic digital receiver from the corrected digital signal power and comparing the adjusted measurement includes computing a difference between the adjusted corrected digital signal power and the reproduced digital signal power and comparing that difference to the reproduced digital signal power. Such a technique enables the measurement of residual distortion.

In a further embodiment, configuring the diagnostic digital receiver includes establishing a predetermined receiver gain, establishing a predetermined transmitter level, probing the at least one diagnostic digital receiver signal includes probing at least one canceller filter coefficient for the at least one wire pair, processing the at least one probed diagnostic digital receiver signal into a measurement includes computing the power of the at least one canceller filter coefficient averaged over a predetermined time interval, adjusting the measurement includes removing a predetermined canceller filter coefficient power attributable to the test cable, the medium dependent interface, and the diagnostic digital receiver from each probed canceller filter coefficient, summing power levels from the at least one adjusted canceller filter coefficient and comparing the adjusted measurement includes comparing the adjusted measurement to a predetermined power transmitted to the port-under-test on the wire pair. Using such a technique enables the measurement of wideband return loss and wideband crosstalk.

Another embodiment includes configuring a second different test port to be a calibration test port terminated with a nominal impedance, connecting the calibration test port as the port-under-test and retaining the measurement as a calibration specific to the at least one wire pair. Such a technique enables the calibration of the wideband return loss and the wideband crosstalk measurements.

Still another embodiment includes configuring a second different test port to be a calibration test port terminated with a predetermined mismatch impedance, connecting the calibration test port as the port-under-test, computing transmit power from the adjusted measurement in combination with a predetermined return loss associated with the predetermined mismatch impedance, retaining the transmit power as the power transmitted and probing the at least one diagnostic digital receiver signal includes probing at least one echo canceller filter coefficient for at least one wire pair. Such a technique enables measuring transmit power as a reference power for the wideband return loss and the wideband crosstalk measurements.

In other embodiments the at least one diagnostic digital receiver signal on the at least one wire pair is an Ethernet signal, the integrated transceiver includes an Ethernet transceiver, the port-under-test includes an Ethernet port and the test port and the port-under-test are coupled by an Ethernet patch cable. In these embodiments, the Ethernet port-under-test can be in a state of idle transmission or transmitting arbitrary packet data while measurements are performed.

A technique to test electrical characteristics of a port-under-test, the method includes establishing a communication link between the port-under-test and a test port, having an integrated transceiver and a medium dependent interface having a wideband impairment coupler, applying at least one pre-characterized physical layer impairment to at least one wire pair of the communication link, obtaining at least one status indication from the integrated transceiver, analyzing the at least one status indication from the integrated transceiver and determining integrity and stability of the communication link caused by at least one pre-characterized physical layer impairment from the at least one status indication. Such a technique enables receiver performance testing under a variety of impairments.

In a further embodiment applying the at least one pre-characterized physical layer impairment to at least one wire pair includes applying a predetermined passive line insertion loss replicating a worst case channel insertion loss, applying an adjustable level of frequency contoured noise approximating the nominal power spectrum of transmission signals, applying an adjustable random transmission symbol timing modulation having a predetermined modulation frequency spectrum, and applying an adjustable symbol frequency offset from nominal symbol rate.

In a further embodiment obtaining the at least one status indication includes sampling a remote receiver error indicator within the integrated transceiver or sampling a link status indicator within the integrated transceiver. In one embodiment, the remote receiver error indicator and the link status indicator are sampled periodically and then the samples are counted.

A system to measure transceiver parameters includes a test port including a microcontroller, a medium dependent interface in communication with the microcontroller and including a wideband impairment coupler, an integrated transceiver in communication with the microcontroller and the medium dependent interface, the integrated transceiver including a diagnostic digital receiver and a transmitter. Such a system facilitates measuring transceiver parameters and testing network interfaces at a physical layer without requiring specialized interface fixtures and abnormal port-under-test internal configurations.

In a further embodiment the diagnostic digital receiver includes an analog front end, an analog to digital (A/D) converter coupled to the analog front end, a digital signal correction logic coupled to the A/D converter, a digital discriminator coupled to the digital signal correction logic and a differential power detector coupled to the A/D converter, the digital signal correction logic, and the digital discriminator.

In a further embodiment the medium dependent interface includes a passive insertion loss impairment circuit switchably coupled to at least one wire pair and a wideband impedance mismatch circuit switchably coupled to at least one wire pair allowing the test port to operate as a calibration test port. In a further embodiment the test port includes a frequency contoured noise generator in communication with the microcontroller and coupled to the medium dependent interface and a timing generator coupled to the integrated transceiver and in communication with the microcontroller.

In a further embodiment the system includes a plurality of test ports linkable to a corresponding plurality of ports-under-test, a backplane coupled to each of the plurality of test ports, a controller blade interfacing the backplane to a host computer and a trigger bus communicating a trigger signal from the controller blade to the plurality of test ports.

In a further embodiment the system includes a pass-through medium dependent interface switchably connectable to the medium dependent interface, the integrated transceiver is switchably connectable to the medium dependent interface and the medium dependent interface with wideband impairment coupler is coupled to the pass-through medium dependent interface in place of the integrated transceiver.

A computer readable storage medium for tangibly storing thereon computer readable instructions includes instructions for establishing a communication link using a test cable between a port-under-test and a test port, having a medium dependent interface (MDI) and an integrated transceiver having a diagnostic digital receiver, configuring the diagnostic digital receiver, probing at least one diagnostic digital receiver signal on at least one wire pair in real time, processing the at least one probed diagnostic digital receiver signal into a measurement, adjusting the measurement using a predetermined calibration and comparing the adjusted measurement to a predetermined standard.

Other arrangements of embodiments disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing test systems explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other media such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. Embodiments of the system can be distributed between many software processes on several data communications devices, or all processes could run on a small set of dedicated computers or on one computer alone.

It is to be understood that the embodiments of the invention can be embodied, as software and hardware, or as hardware and/or circuitry alone, such as within a data communications device. The features of the invention, as explained herein, may be employed in data communications devices and/or software systems for such devices. The embodiments disclosed herein, may be employed in software and hardware systems such as those manufactured by Sifos Technologies Inc. of Tewksbury Mass.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways. Note also that this Summary section herein does not specify every embodiment and/or incrementally novel aspect of the present disclosure or claimed invention. Instead, this Summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for testing network interfaces, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Embodiments disclosed herein provide instruments and processes for parametric testing of network interfaces at the physical layer and certain embodiments are used for testing 10Base-T "Ethernet", 100Base-Tx "Fast Ethernet", and 1000Base-T "Gigabit Ethernet" interfaces.

Figure 1:
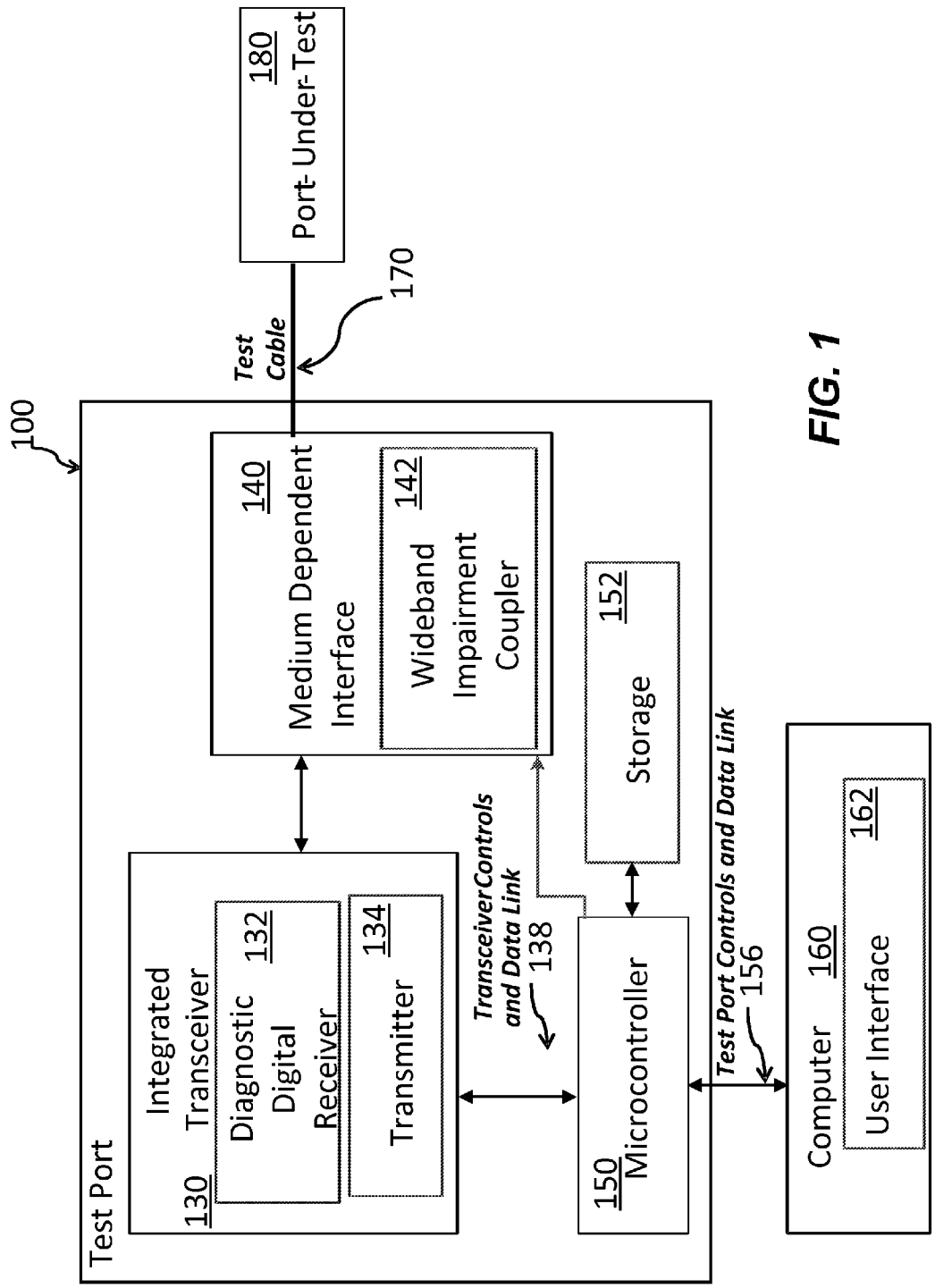
FIG. 1 is a block diagram of a test port in accordance with embodiments disclosed herein.

Now referring to FIG. 1, a test port 100 includes a microcontroller 150 in communication with a Medium Dependent Interface (MDI) 140 and an integrated transceiver 130. The integrated transceiver 130 is coupled to the MDI 140 in order to support a communications link using a test cable 170 between the test port 100 and a port-under-test 180. The test port 100 further includes storage 152 linked to the microcontroller 150. It is understood that the storage 152 can be internal or external to the microcontroller 150.

Still referring to FIG. 1, the integrated transceiver 130 further includes a diagnostic digital receiver 132 and a transmitter 134. The diagnostic digital receiver is described below during the discussion of FIG. 2. The microcontroller 150 sends transceiver controls and sends and receives data over transceiver controls and data link 138 (also referred to as data link 138). The microcontroller 150 is coupled to an external computer 160. The computer 160 includes a user interface 162 and sends test port controls and sends and receives data over link 156 to the microcontroller 150. The MDI 140 includes a wideband impairment coupler 142. The wideband impairment coupler 142 is controlled by the microcontroller 150 and is described in more detail below in conjunction with FIGS. 4, 6 and 14. In one embodiment the integrated transceiver 130 is an Ethernet 10/100/1000Base-T integrated transceiver, the test cable 170 is an Ethernet patch cord with 4 twisted pairs terminated in RJ-45 plugs on both ends, and the port-under-test 180 is an Ethernet port.

In operation in an embodiment for testing Ethernet ports, the test port 100 measures characteristics of incoming 100Base-Tx and 1000Base-T signals. The integrated transceiver 130 is deployed to enable 10/100/1000Base-T link communications with the port-under-test 180. The physical connection is made using the Ethernet test cable 170 connected to the MDI 140. The microcontroller 150 executes software or firmware to configure, manage, and acquire data from the integrated transceiver 130. The microcontroller 150 controls and receives digital data from the integrated transceiver using the transceiver controls and data link 138. The computer 160 handles post processing of the data acquired from the integrated transceiver 130 in conjunction with the microcontroller 150 to perform required data processing and user interface tasks such as receiving user input and displaying results. The computer 160 can be connected directly to the microcontroller 150 or can be connected remotely, for example over a network, to the microcontroller 150.

Figure 2:
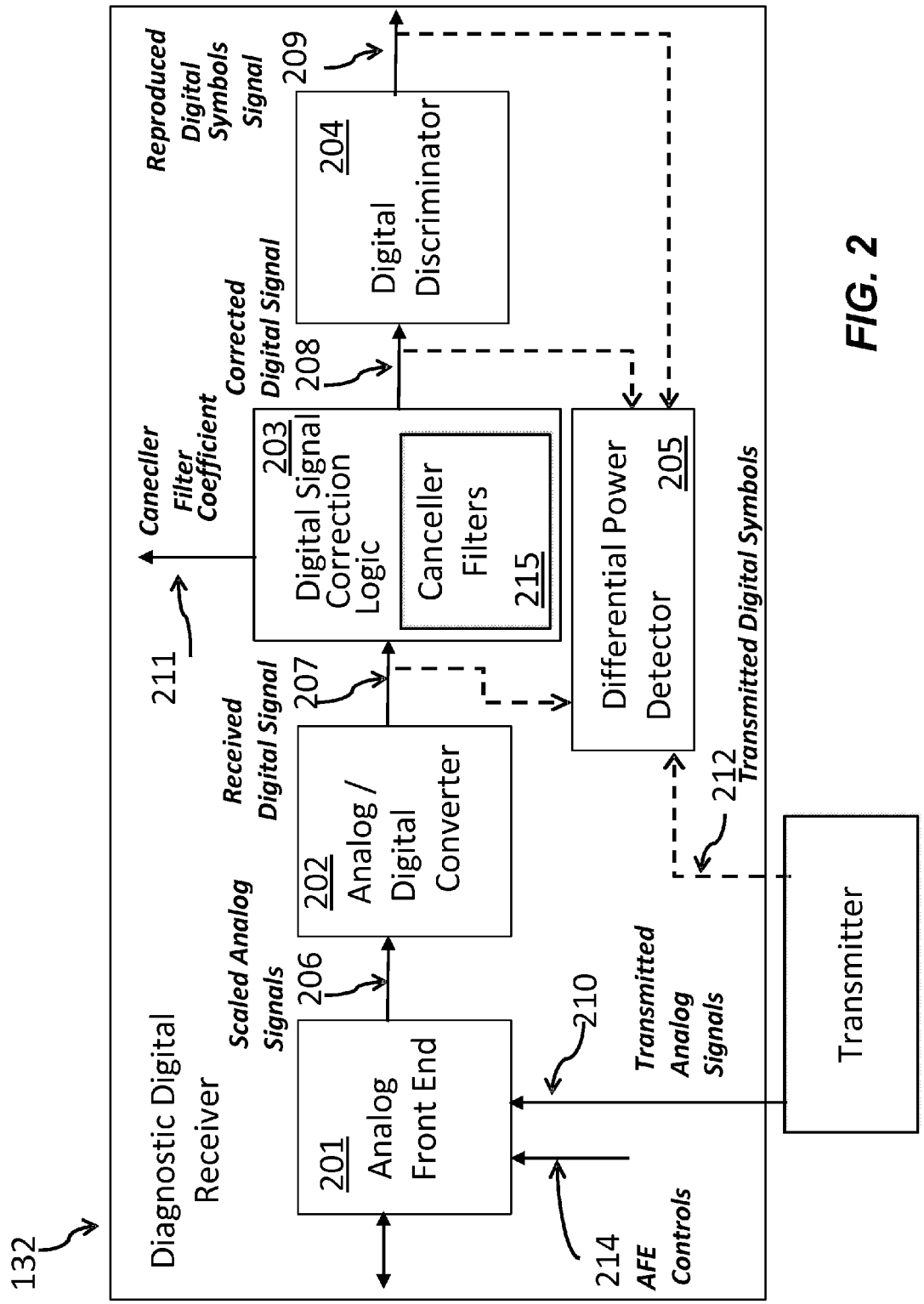
FIG. 2 is a block diagram of a diagnostic digital receiver included in the integrated transceiver of FIG. 1.

Now referring to FIG. 2, an embodiment of the diagnostic digital receiver 132 included in the integrated transceiver 130 includes an analog front end 201, an analog to digital (A/D) converter 202, digital signal correction logic 203 including canceller filters 215, a digital discriminator 204 and a differential power detector 205. The analog front end (AFE) 201 is connected to the A/D converter 202 which is connected to the digital signal correction logic 203 which is connected to the digital discriminator 204 which is connected to the differential power detector 205. The analog front end 201 receives signals from the MDI 140 and is configured from the microcontroller using AFE controls 214. The differential power detector 205 is also connected to the A/D converter 202, the digital signal correction logic 203 and the transmitter 134. The analog front end 201 is connected to the MDI 140. The integrated transceiver 130 implements a diagnostic digital receiver 132 for each incoming wire pair from the MDI 140 that is conveying signals to be received.

In order to facilitate transmission test methods as disclosed herein, the integrated transceiver 130 implements the diagnostic digital receiver 132 such that certain aspects of the diagnostic digital receiver 132 can be configured through the transceiver controls and data link 138 by controlling registers within the diagnostic digital receiver 132. Information developed within the digital signal processing stages of the diagnostic digital receiver 132 can be probed in real time by accessing and reading the diagnostic digital receiver 132 registers.

Embodiments of the diagnostic digital receiver 132 include digital receivers that include digital signal processing functions and enable access to internal digital signals, including derivatives of internal digital signals, such that at least one internal digital signal or at least one derivative result can be probed and processed into at least one measurement. One embodiment of probing an internal digital signal or derivative result includes reading digital registers within the integrated transceiver 130.

In operation in the embodiment for testing Ethernet ports, the analog front end 201 of the diagnostic digital receiver 132 receives one or more transmitted signals from the MDI 140 and transforms those signals into one or more scaled analog signals 206 to condition them for analog to digital conversion. This typically involves at least two processing functions: Hybrid echo cancellation utilized for removing the locally transmitted component from the incoming received 1000Base-T signal and amplification or attenuation of the incoming received signal so that analog to digital conversion is optimized. The analog front end 201 may also apply frequency-selective filtering but should maintain sufficient signal bandwidth to assure that incoming frequency components up to 100 MHz are preserved for later digital signal processing. The A/D converter 202 converts the scaled analog signal 206 into a digital format. This conversion operates to provide over 100 MHz of signal conversion bandwidth such that the received digital signal 207 retains frequency components of the scaled analog signal 206 up to at least 100 MHz. The digital signal correction logic 203 provides several digital signal processing functions designed to remove predictable forms of signal distortion from the received digital signal 207. Digital signal correction functions include, but are not limited to, equalization correction for insertion loss and phase shifting effects of long cable connections, cancellation of remnants of locally transmitted signals from incoming receiver signals, and gain compensation for very low frequency power levels that develop because of specific data value patterns in the transmitted signal. The corrected digital signal 208 is sent to the digital discriminator 204. In one embodiment, each of these digital signals updates at or faster than 8 nanoseconds, the fundamental symbol time for 100Base-Tx and 1000Base-T.

The digital discriminator 204 resolves the corrected digital signal 208 into one of the allowable digital symbol values for 100Base-Tx or 1000Base-T depending on the current link rate. Most forms of incoming signal distortion and noise are absent from the reproduced digital signal 209 at the output of the digital discriminator 204. Therefore, under ordinary operating conditions, the reproduced digital signal 209 exactly replicates the ideal form of the transmitted signal from the port-under-test 180. The differential power detector 205 of the diagnostic digital receiver 132 includes a real time connection to the received digital signal 207, the corrected digital signal 208, and the reproduced digital signal 209. In other possible embodiments, the differential power detector 205 has visibility into other digital signals within the integrated transceiver 130 including the transmitted digital symbols signal 212. The dotted lines in FIG. 2 from 207, 208, 209, and 212 indicate selectable inputs into the differential power detector 205. One function of the differential power detector 205 is to compute signal power levels in two dimensions. The first dimension is a digital coding space, where only those signals that correlate over time based on digital coding patterns are compared. The second dimension is phase, which includes assessing power level given arbitrary phase, or symbol interval, relationships between the signals being compared. The differential power detector 205 includes an ability to compare different incoming signals with different phase relationships and also to assess a single incoming signal to measure an absolute power level in that signal. The inventors have discovered that it is possible to probe signals from the integrated transceiver 130 which are useful in characterizing transmission signal quality of the port-under-test 180.

Figure 3:
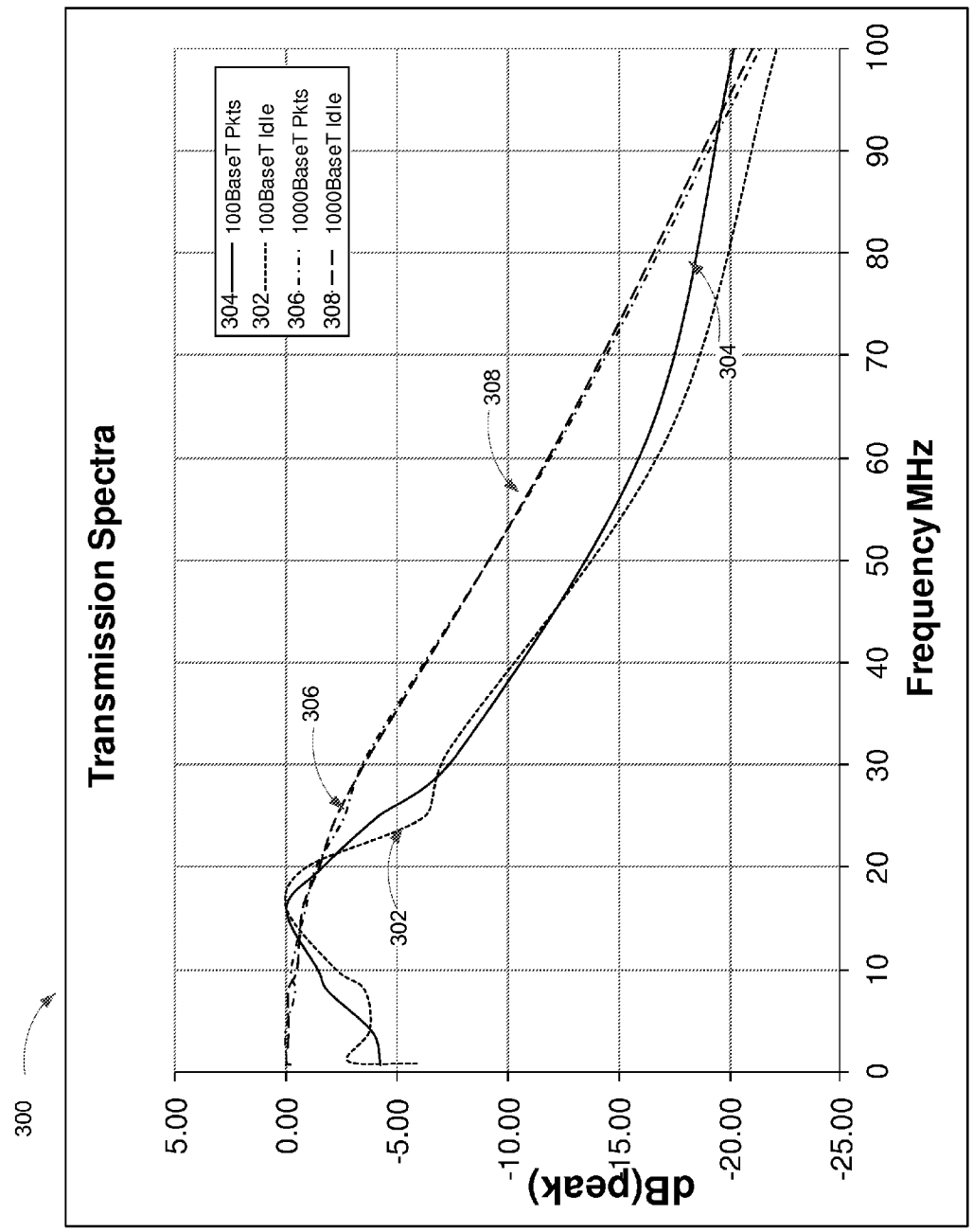
FIG. 3 are frequency-power spectra of "Fast Ethernet" 100Base-Tx and "Gigabit Ethernet" 1000Base-T transmission signals each normalized to a peak power of 0 dB.

FIG. 3 depicts typical signal power spectra 300 for 100Base-Tx transmitted signals 302 and 304 and 1000Base-T transmitted signals 306 and 308 (signals 302, 304, 306 and 308 are also referred to as spectrum or collectively as spectra). The spectra have been scaled such that peak power versus frequency is normalized to 0 decibels (dB). Because of the highly randomized idle coding patterns used in 100Base-Tx and 1000Base-T during periods of no data traffic, the spectra for each signal type is largely unaffected by the presence or removal of packet traffic. Both 100Base-Tx and 1000Base-T spectra concentrate energy in the lower half of the plotted spectrums from 0 MHz to 100 MHz and in both cases, though not visible in the transmission spectra, the spectral power below 100 KHz becomes highly attenuated as frequency diminishes because of transformer coupling utilized in the 10/100/1000Base-T Medium Dependent Interface 140.

Figure 4:
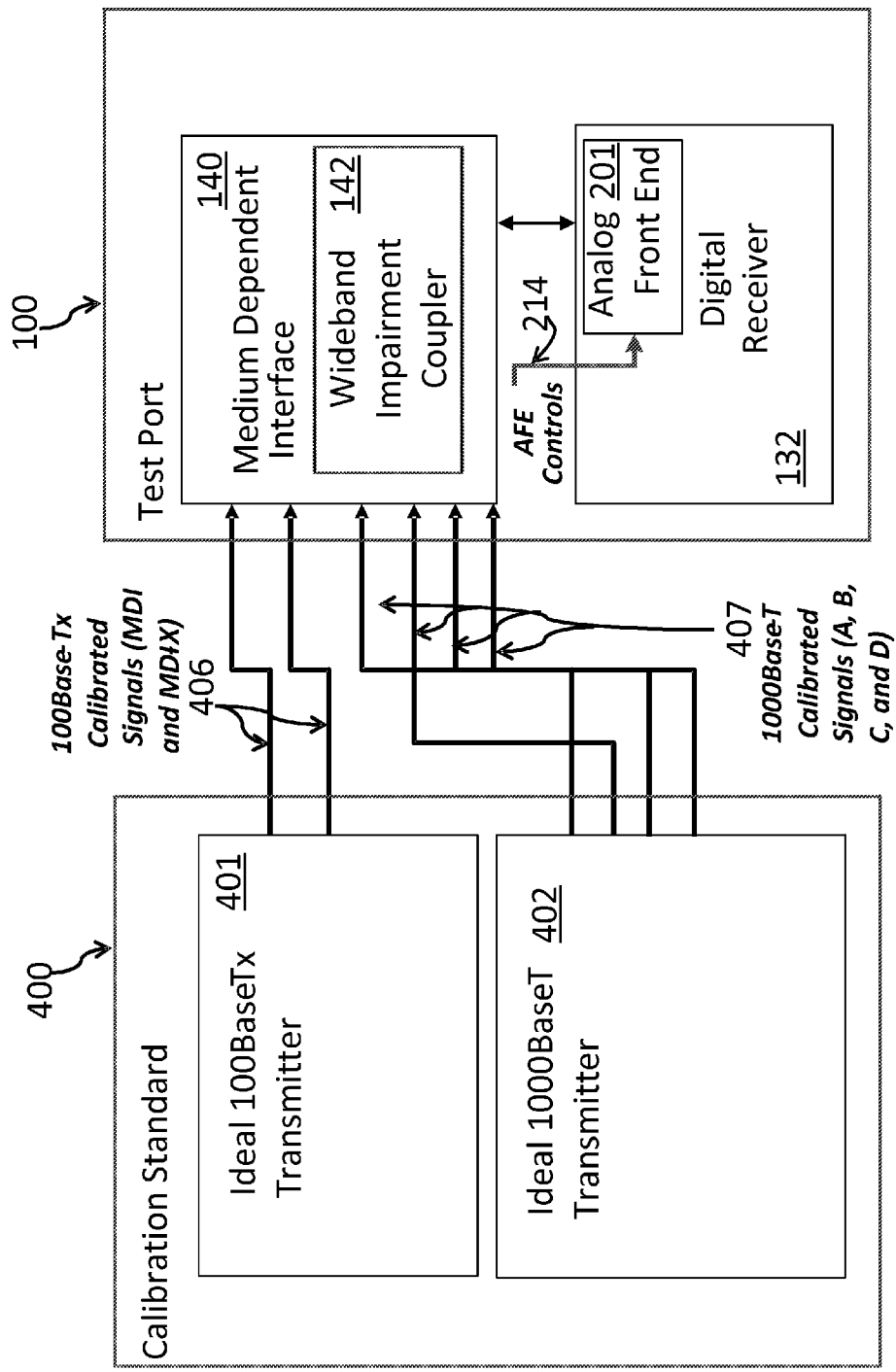
FIG. 4 is a block diagram of a wideband signal power measurement calibration procedure applicable to the test port of FIG. 1.

Now referring to FIG. 4, in an Ethernet embodiment of the wideband signal power calibration, a calibration standard 400 for wideband signal power calibration includes an ideal 100Base-Tx transmitter 401 and an ideal 1000Base-T Transmitter 402. The 100Base-Tx Transmitter 401 generates 100Base-T calibrated signals 406 in both MDI and MDI crossover (MDI-X) configurations (e.g., on test cable 170 wire pair 2 for MDI and wire pair 3 MDI-X). The 1000Base-T Transmitter 402 generates 1000Base-T calibrated signals 407 on four wire pairs (e.g. on test cable 170 wire pairs 1, 2, 3, and 4). During calibration of the test port 100, the transmitter 401 and the transmitter 402 are coupled to the MDI 140 of the test port 100. AFE Controls 214 are utilized to configure a predetermined receiver gain in the analog front end 201 of the diagnostic digital receiver 132 that will be replicated when measurements are performed on the port-under-test 180. During the calibration, a signal power measurement is performed and the power loss calibration is computed as the difference between the measurement and a predetermined reference power level.

When linked to a test port 100, transmitter 401 provides a 2 Vpeak to peak, 4 nanosecond Rise/Fall Time signal according to IEEE 802.3 Clause 25. When linked to a test port 100, transmitter 402 provides four 1.5 Vpeak to peak (test signal 1 Pt A-B Filtered), center mask fit (test signal 1, Pts A, B, C, D filtered) signals according to IEEE 802.3 Clause 40. Calibrated signals 406 and 407 are configured and independently validated to operate at IEEE 802.3 specified nominal amplitude (peak-peak voltage) and slew rate (rise/fall time), using methods and apparatus known in the art.

In one embodiment, the calibration standard 400 is used for a permanent calibration performed when the test port 100 is calibrated at a manufacturing facility and calibration measurements are retained in storage 152 or other available storage. Additional details on specific measurements and calibrations are described below in conjunction with FIGS. 11-13 and FIGS. 16-19.

Figure 5:
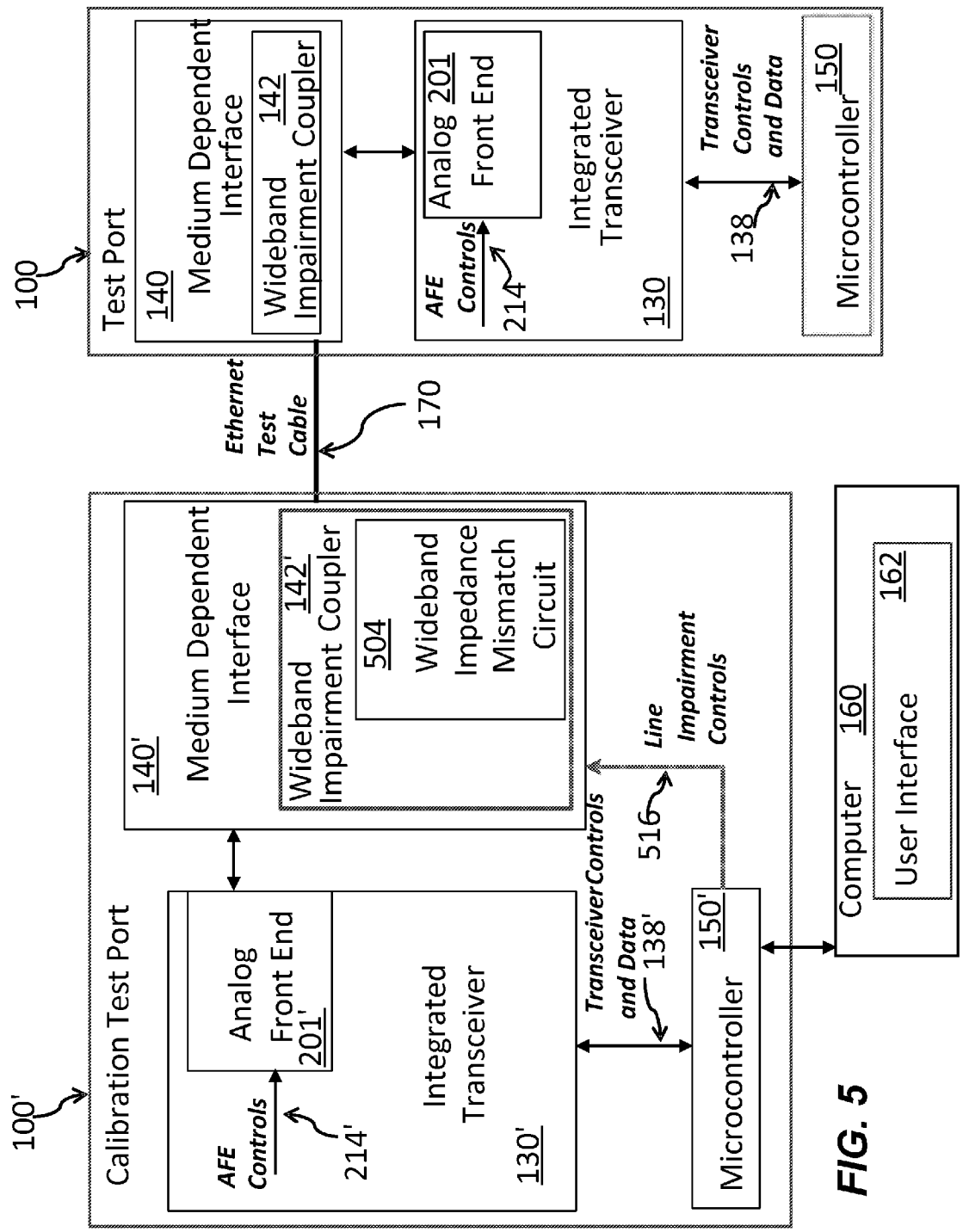
FIG. 5 is a block diagram of a calibration test port used to locally calibrate the test port of FIG. 1.

FIG. 5 illustrates a block diagram of an embodiment of a calibration test port 100'. The calibration test port 100' includes a microcontroller 150' with modified firmware to provide additional calibration features. It is understood that microcontroller 150' could be identical to microcontroller 150 with the additional features being selectable under software control. The calibration test port 100' includes an integrated transceiver 130', a medium dependent interface (MDI) 140', analog front end 201', and wideband impairment coupler 142', which are similar to the corresponding elements of test port 100 but provide additional features when operated as part of calibration test port 100'.

In one embodiment to obtain power spectral distortion calibration, a second test port 100 is configured as a calibration test port 100' including a medium dependent interface 140' having a wideband impairment coupler 142' that includes a wideband impedance mismatch circuit 504. During calibration, line impairment controls 516 configure the wideband impairment coupler 142' within the medium dependent interface 140' to present a nominal impedance on each wire pair by disconnecting the wideband impedance mismatch circuit 504. AFE controls 214' are utilized to configure a predetermined transmit level and transmit slew rate within the analog front end 201'. These predetermined settings are selected to produce a near-nominal power-frequency spectrum in the transmitted signals. The computer 160 directs the test port 100 to perform the wideband signal power measurement and the computer 160 adjusts AFE controls 214' to the analog front end 201' in the calibrating test port 100' to more precisely replicate a nominal transmit power spectrum. The test port 100 then performs the inter-symbol interference measurement and the results are retained as the calibration. This process is repeated for each wire pair. In one embodiment, calibrations are retained on the computer 160. In another embodiment, calibrations are retained in test port 100 storage 152. This calibration compensates for the unknown power-spectral characteristics of the diagnostic digital receiver 132, including the analog front end 201, the medium dependent interface 140, including the wideband impairment coupler 142, and the test cable 170.

In another embodiment calibration test port 100' is used to provide wideband return loss and the wideband crosstalk calibration. The calibration compensates for the unknown return loss and crosstalk characteristics of the diagnostic digital receiver 132, including the analog front end 201, the medium dependent interface 140, including the wideband impairment coupler 142 of the test port 100, and the test cable 170. During the calibration, line impairment controls 516 configure the wideband impairment coupler 142' to present a nominal impedance on each wire pair by disconnecting the wideband impedance mismatch circuit 504. The calibrating test port 100' then becomes the port-under-test 180 and is coupled to the test port 100 using the test cable 170. AFE controls 214 are used in the integrated transceiver 130 of the test port 100 to configure the predetermined gain and the predetermined transmit level that is replicated for measurements of a port-under-test 180 and for measurement of test port transmit power. At this point the measurement of canceller power is performed under control of the computer 160 and retained as a calibration. The calibration is associated with a wire pair if the calibration is a return loss calibration and is repeated for each wire pair. The calibration is associated with a wire pair combination if the calibration is a crosstalk calibration and is repeated for each wire pair combination. In one embodiment, calibrations are retained on the computer 160. In another embodiment, calibrations are retained in test port 100 storage 152.

Still referring to FIG. 5, in one embodiment, a test port 100 transmit power measurement is used to produce a reference power level used by wideband return loss and wideband crosstalk measurements. In this embodiment, a second test port 100 is configured as a calibration test port 100' and line impairment controls 516 configure the wideband impairment coupler 142' to present a wideband mismatch impedance by connecting the wideband impedance mismatch circuit 504. In this embodiment, the wideband impedance mismatch circuit 504 causes the calibrating test port 100' to present a deviant, non-nominal return loss between 1 MHz and 100 MHz. In one embodiment, this return loss is −12 dB. The calibrating test port 100' then becomes the port-under-test 180 and is coupled to the test port 100 using the test cable 170. AFE controls 214 are used in the integrated transceiver 130 of the test port 100 to configure the predetermined gain and the predetermined transmit level that is replicated for measurements of the port-under-test 180 and for calibrations associated with wideband return loss and wideband crosstalk. At this point the measurement of canceller power is completed under control of the computer 160. The computer 160 then accesses the predetermined calibration associated with the wire pair and applies the adjustment to form total adjusted coefficient power. The computer 160 calculates the transmit power associated with the wire pair using the return loss value associated with the wideband impedance mismatch circuit 504. In one embodiment, the calculated transmit power is retained on the computer 160. In another embodiment, the calculated transmit power is retained in test port 100 storage 152. Embodiments including a plurality of test ports 100 where one test port is connected to another, and one test port 100 of each pair operates as a calibration test port 100' advantageously provide self-calibration.

Figure 6:
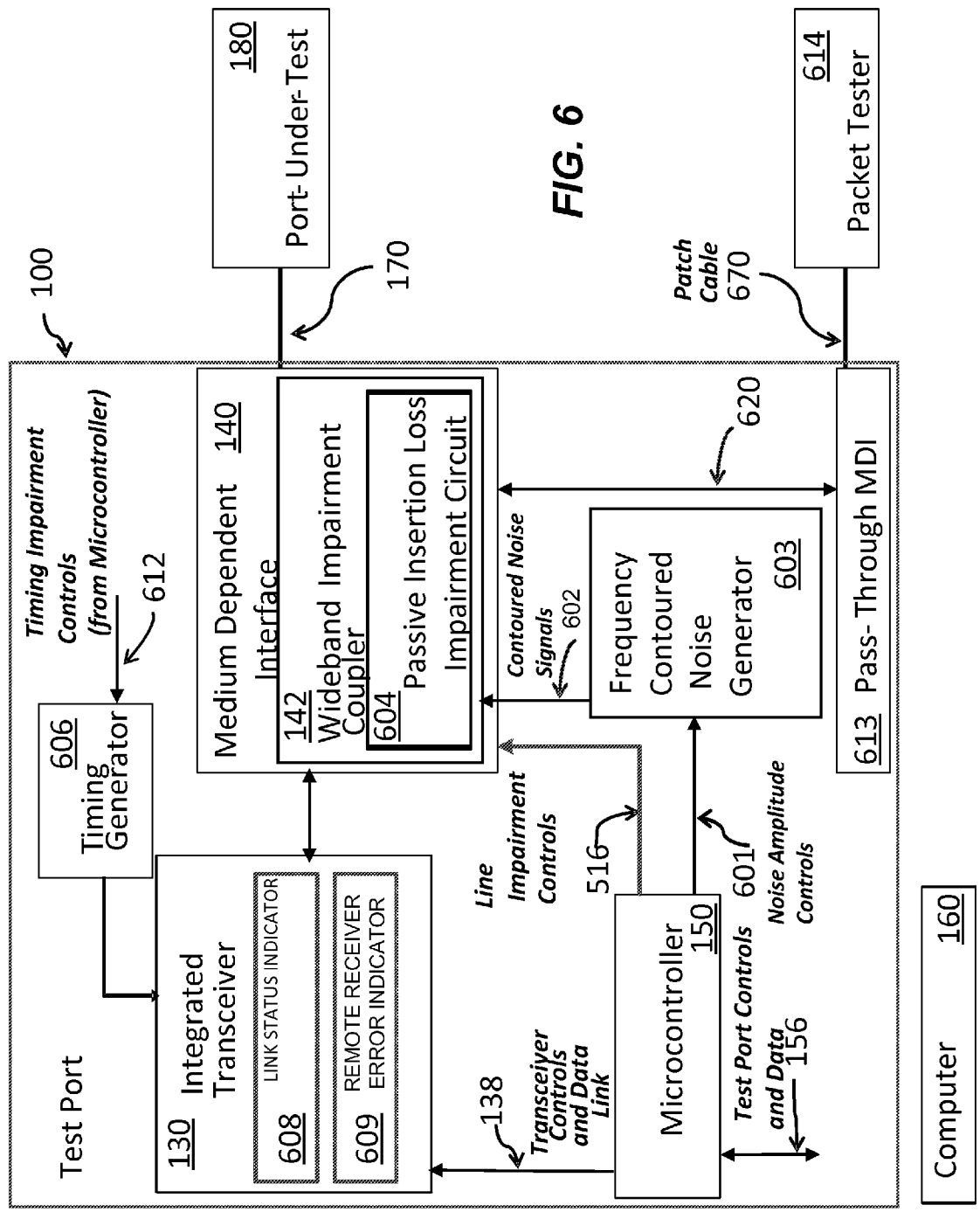
FIG. 6 is a block diagram of circuits for additional physical layer receiver integrity measurements included in the test port of FIG. 1.
Figure 7:
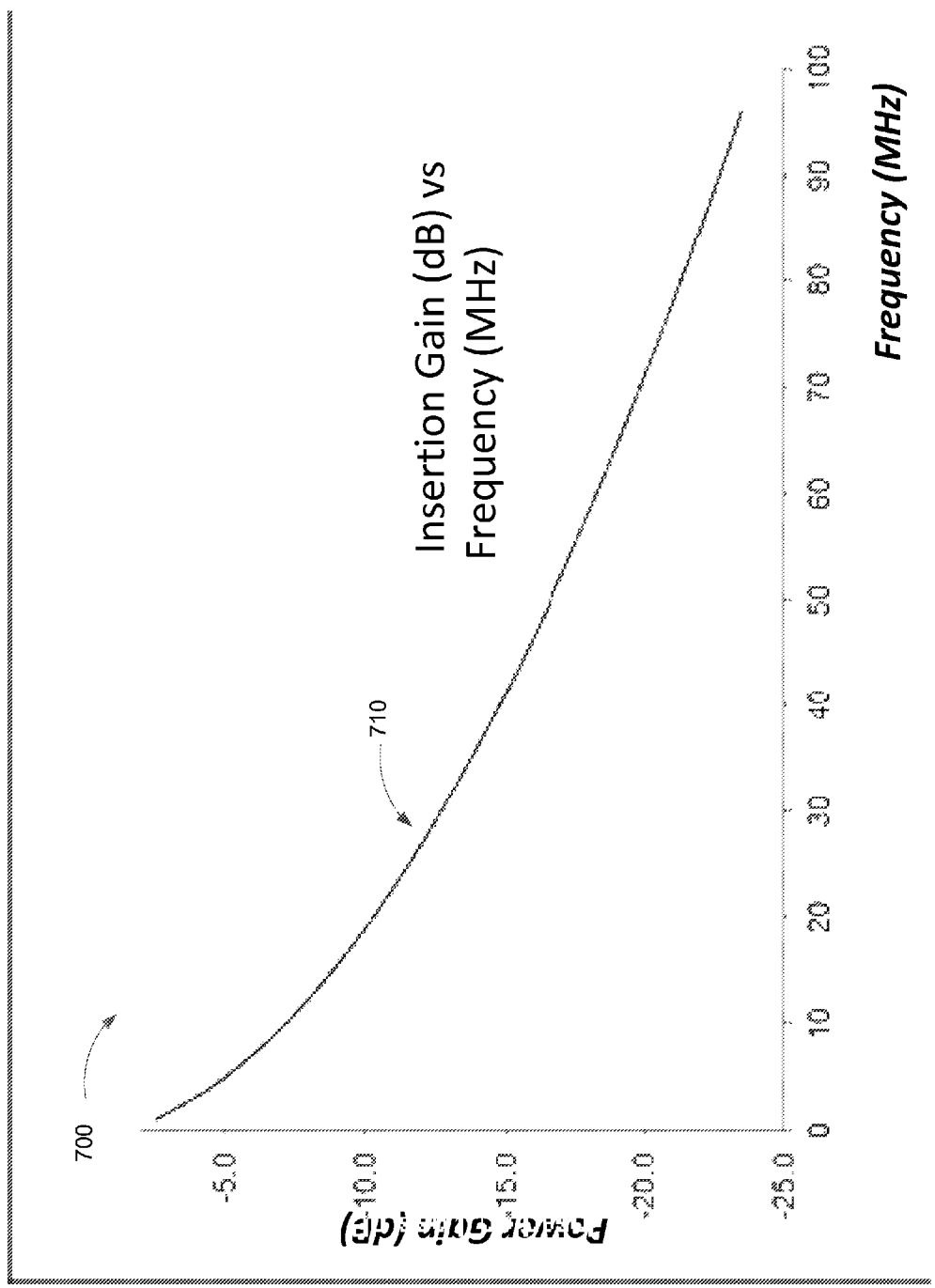
FIG. 7 is a graph of the worst case link insertion loss allowed between any two link partners such as the Port-Under-Test of FIG. 1.
Figure 8:
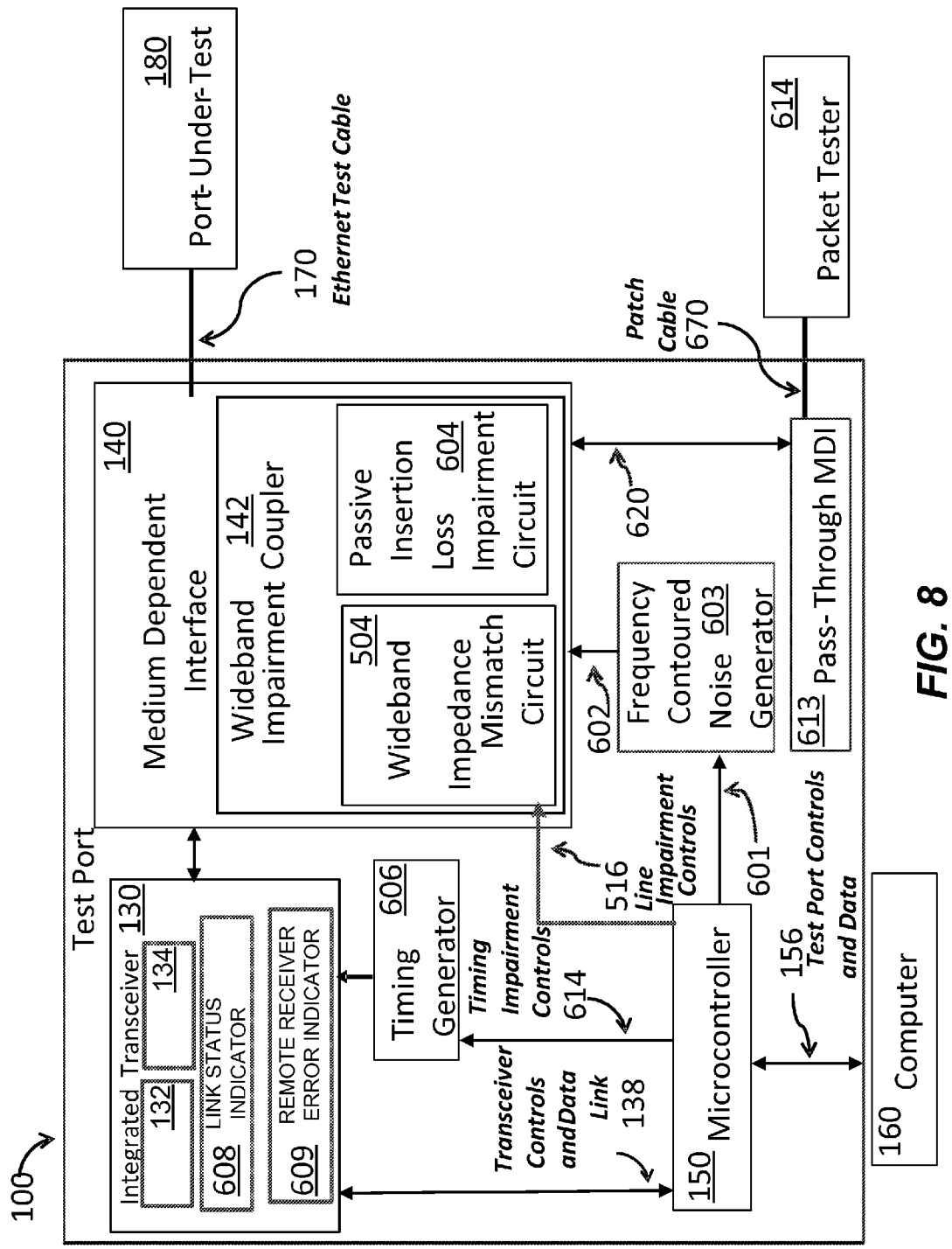
FIG. 8 is a block diagram of a test port embodiment including circuits for a calibration test port and for receiver integrity measurements in accordance with embodiments disclosed herein.
Figure 14:
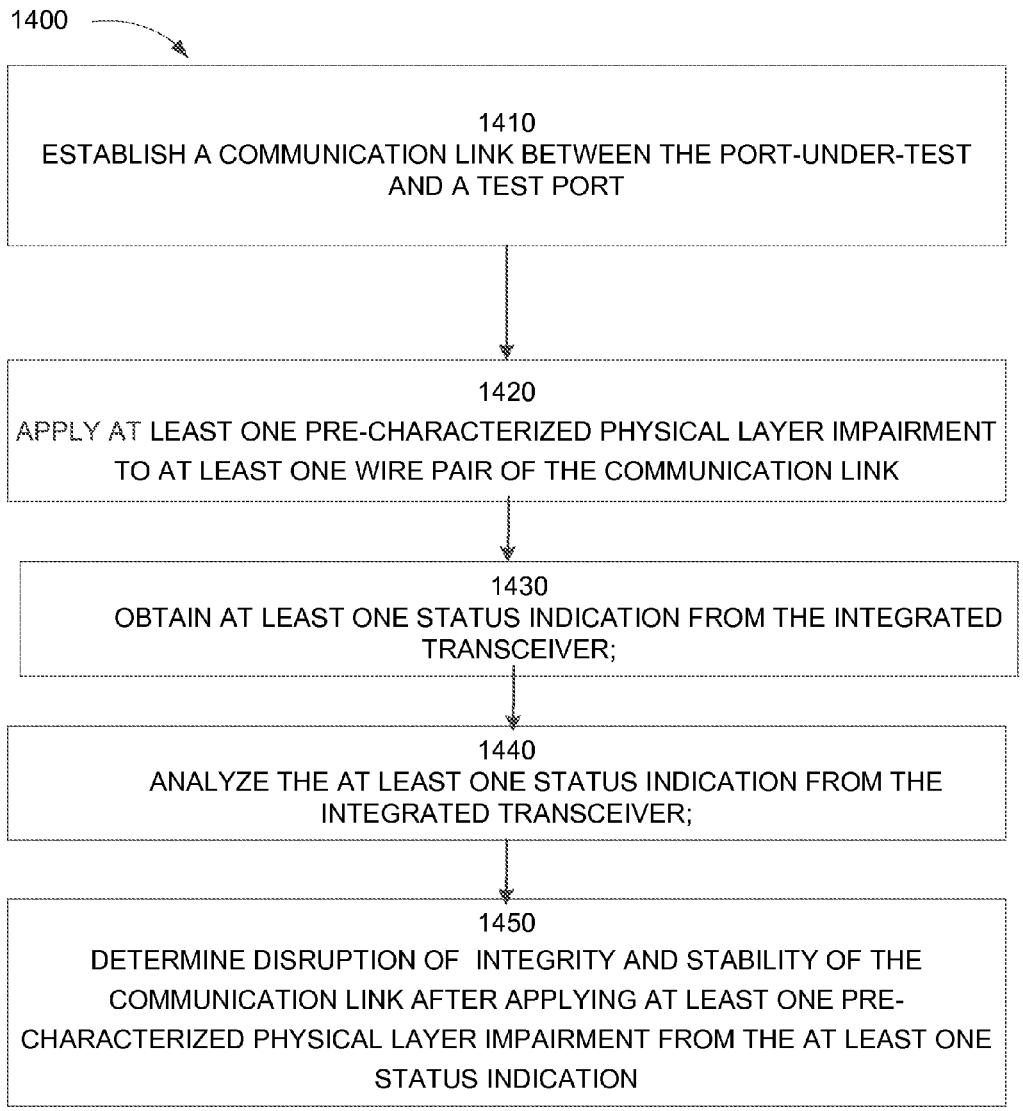
Figure 15:
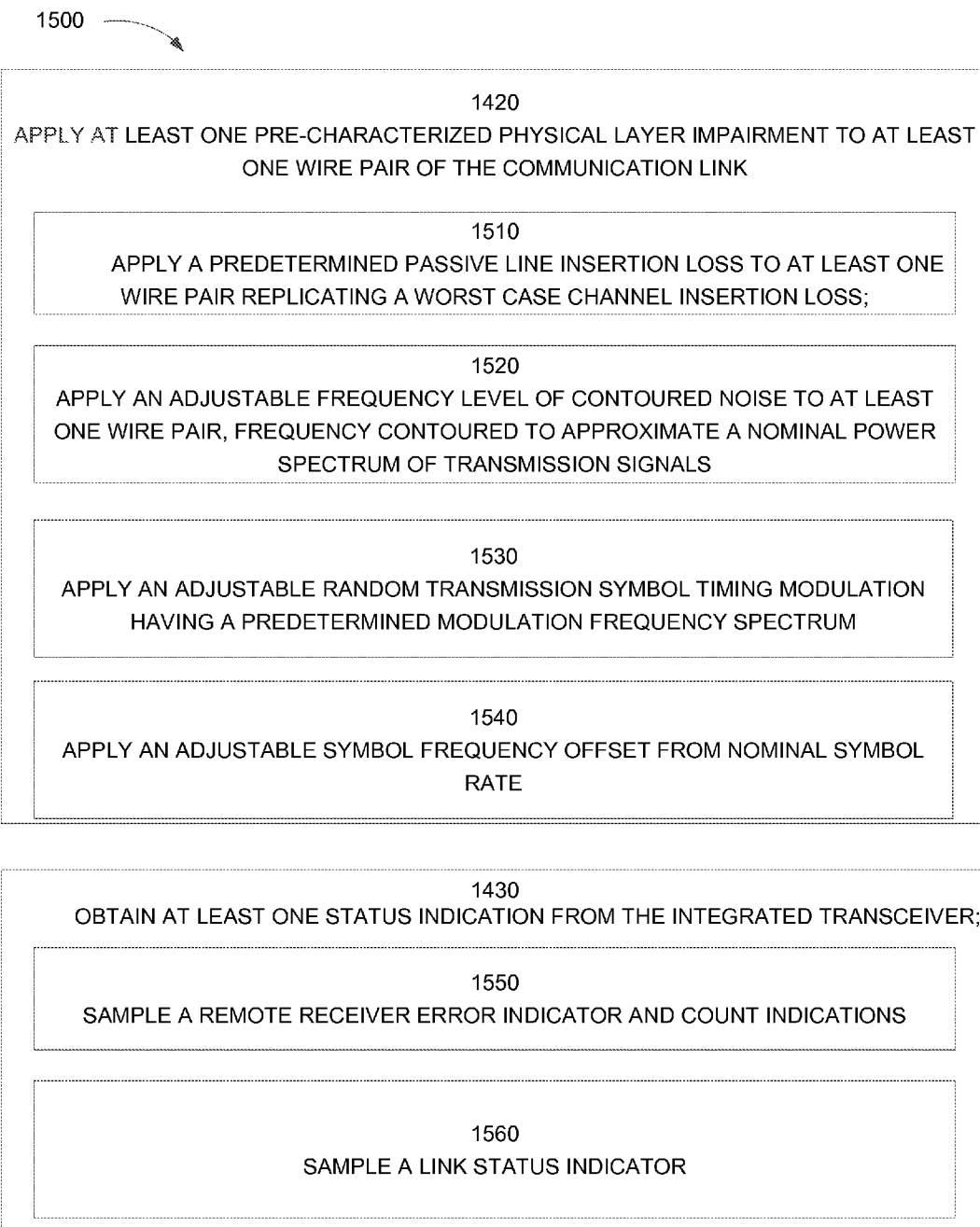

In FIGS. 6-8, particular physical layer impairments are disclosed and the use of these impairments is described in greater detail in conjunction with FIGS. 14-15. A physical layer impairment is a characteristic that adversely affects the quality and integrity of a transmitted electrical signal and thus places added burden on the receiver in the port-under-test 180 that is attempting to recover the originally transmitted information without errors. A pre-characterized physical layer impairment is one that produces a known type and degree of transmitted signal degradation. The application of a physical layer impairment to at least one wire pair includes, but is not limited to, selectively switching electronic components into a circuit through which the transmitted signal passes, using a circuit to combine a transmitted signal with an impairing signal, and modifying at least one characteristic of the transmitted signal in such a way that it deviates from a nominal transmitted signal.

Referring now to FIG. 6, an embodiment of the test port 100 includes additional features for conducting receiver performance testing of a port-under-test 180. Test port 100 additionally includes a timing generator 606 coupled to the integrated transceiver 130 and the microcontroller 150. The timing generator 606 regulates the to the port-under-test 180. The timing generator 606 also modulates the transmission symbol frequency of transmitted signals produced by the integrated transceiver. The timing generator 606 is controlled by the microcontroller 150 using timing impairment controls 612 and provides a plurality of configurations for random transmission symbol timing modulation. The test port 100 further includes a frequency contoured noise generator 603 coupled to the microcontroller 150 and the wideband impairment coupler 142 within the medium dependent interface 140. Under control of the microcontroller 150 using noise amplitude controls 601, the frequency contoured noise generator 603 produces contoured noise signals 602 that are configured to one of a plurality of magnitudes of random amplitude noise that is then electronically filtered to match a predetermined frequency spectrum.

The wideband impairment coupler 142 within the medium dependent interface 140 includes a passive insertion loss impairment circuit 604 that implements the worst case channel insertion loss as defined by a published standard for each wire pair utilized by the communication link. The test port 100 further includes a pass-through medium dependent interface (MDI) 613 coupled to the wideband impairment coupler 142. The pass-through medium dependent interface (MDI) 613 can be coupled, using a patch cable 670, to a packet tester 614. The packet tester 614 includes any apparatus capable of establishing a communication link with the port-under-test 180, though its primary purpose is to transmit data packets to and receive data packets from the port-under-test 180. The wideband impairment coupler 142 is controlled by the microcontroller 150 using line impairment controls 516 to connect and disconnect the worst case channel insertion loss and frequency contoured noise impairments on at least one wire pair, and it can route the medium dependent interface 140 coupling to one of the integrated transceiver 130 and the pass-through MDI 613. In this manner, the worst case channel insertion loss and frequency contoured noise impairments can be applied in a communication link between the integrated transceiver 130 and the port-under-test 180 and also between the packet tester 614 and the port-under-test 180. Finally, the integrated transceiver 130 includes a link status indicator 608 and a remote receiver error indicator 609 that can be accessed by the microcontroller 150 using the transceiver controls and data link 138. The link status indicator 608 provides instantaneous information regarding the status of the communication link and the remote receiver error indicator 609 provides instantaneous information originating from the port-under-test 180 regarding the status of receiver performance within the port-under-test 180. The user, via the user interface 162 and microcontroller 150 which controls impairment circuits, can apply at least one impairment configured to at least one level to assess the degree of port-under-test tolerance to each of these impairments.

In an embodiment of the test port 100 for testing 10/100/1000Base-T Ethernet ports, the integrated transceiver 130 is an Ethernet transceiver where the remote receiver error status indicator 609 is the 1000Base-T Remote Receiver Status register that is available when links are configured as 1000Base-T. The link status indicator 608 is in one embodiment a Link Status register that is available at all link rates, 10Base-T, 100Base-Tx, and 1000Base-T. The medium dependent interface 140 couples the signals on four wire pairs between the integrated transceiver 130 and the test cable 170. The wideband impairment coupler 142 can apply the passive insertion loss impairment circuit 604 and the contoured noise signals 602 to selected wire pairs and it can electrically switch the four wire pairs between the integrated transceiver 130 and the pass-through MDI 613. In 10Base-T and 100Base-Tx communication links, the passive insertion loss impairment circuit 604 and contoured noise signals 602 are optionally applied in just one direction, that is, applied to the wire pair conveying the signal transmitted to the port-under-test 180 without impairing the wire pair conveying the signal transmitted by the port-under-test 180 to the integrated transceiver 130 and the packet tester 614. The passive insertion loss impairment circuit approximately implements the worst case IEEE 802.3 1000Base-T insertion loss and does this with matched impedance of 100 ohms and also with approximately linear phase versus frequency response in order to best simulate the characteristics of a long Ethernet cable. The frequency contoured noise generator 603 approximately produces the frequency spectrum of the 100Base-Tx IDLE transmission spectrum 302 and is adjustable to a plurality of amplitudes including 40 mVpeak-peak that is the minimum noise level receivers must tolerate as specified in IEEE 802.3 for 100Base-Tx and 1000Base-T. The modulation range of the timing generator 606 is adjusted to a plurality of settings including the worst case IEEE 802.3 100Base-Tx and 1000Base-T jitter of 1.4 nsec peak-peak and the frequency spectrum of the modulation produced by the timing generator 606 includes single filter pole attenuation above 5 KHz as specified by IEEE 802.3 for 1000Base-T communication links. The symbol frequency offset produced by the timing generator 606 is adjusted to a plurality of settings including the IEEE 802.3 worst case ±50 ppm specified for 100Base-Tx and ±100 ppm specified for 1000Base-T, both ppm specifications referenced to 125 Msymbols/second. The test cable 170 and the patch cable 670 are both Ethernet patch cables and the packet tester 614 is an Ethernet packet tester.

Referring to FIG. 7, a graph 700 depicting insertion gain versus frequency 710 is presented. In this diagram, the term gain is applied since the values of gain are negative meaning power is increasingly attenuated as the frequency is increased. The insertion gain versus frequency 710 plot shown embodies the IEEE 802.3 1000Base-T worst case insertion loss.

Referring now to FIG. 8, an embodiment of the test port 100 combines all of the elements and features of test ports described in FIGS. 1, 2, 5 and 6. As described above, test port 100 also embodies the calibrating test port 100'. One test port 100 tests electrical transmission characteristics and electrical characteristics pertaining to receiver performance of the port-under-test 180. A test port 100 also operates as a calibration port 100' in order to calibrate a second, different test port 100. The test port 100 can be calibrated on a schedule, when a test cable 170 or patch cable is changed, or when the environment in which the test port 100 operates is changed.

Figure 9:
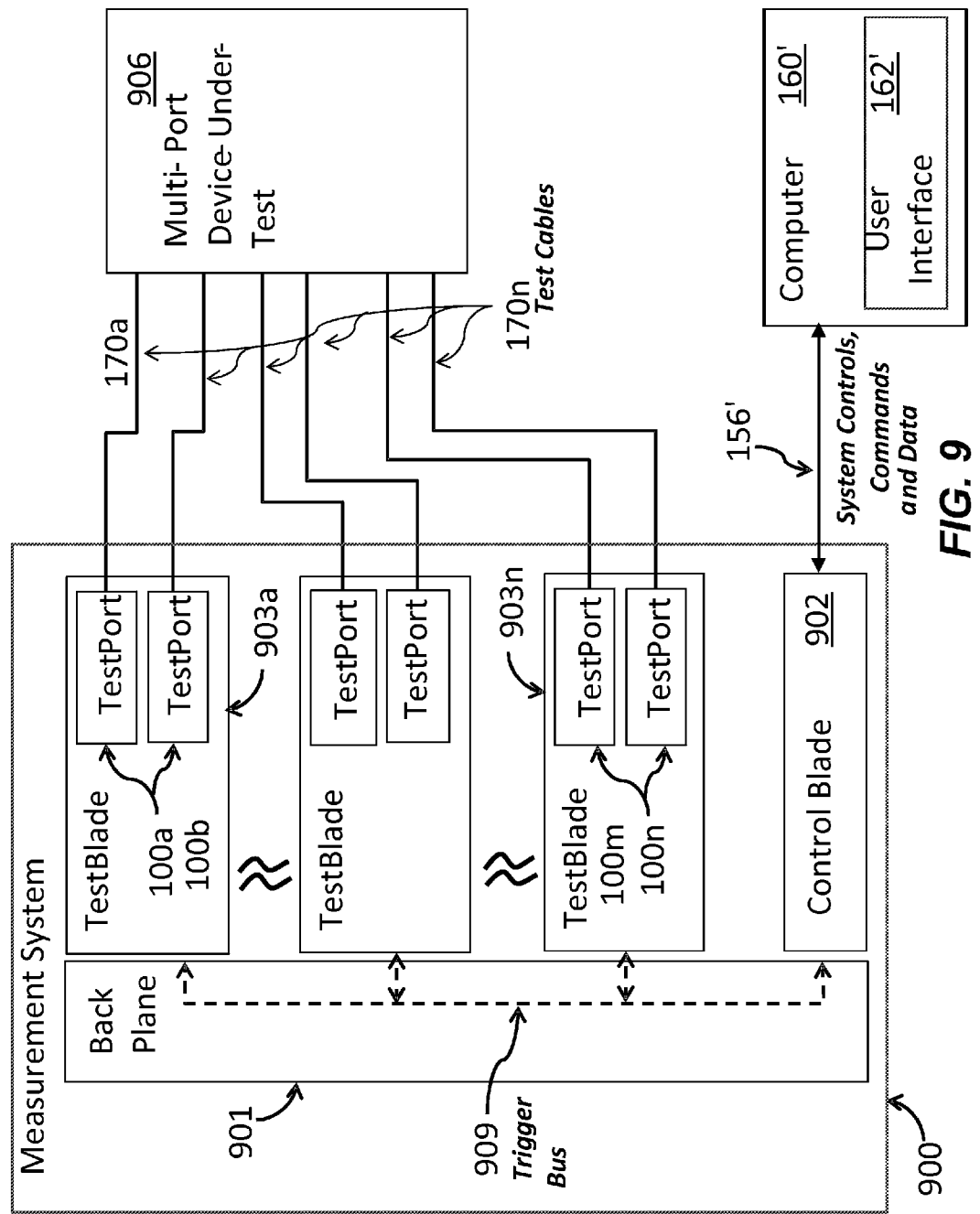
FIG. 9 is a block diagram of multiple test port configuration of the test port of FIG. 8.

Now referring to FIG. 9, a measurement system 900 combines a plurality of test ports 100a-100n to test a multi-port device-under-test 906. The measurement system 900 includes a backplane 901 connected to and shared by a plurality of test blades 903a-903n (generally referred to as test blade 903), each test blade 903 including a corresponding pair of test ports 100a-100n. Each one of the corresponding pair of test ports 100a, 100b-100m, 100n is similar to test port 100 and referred to individually as test port 100. The multiple test port configuration 900 further includes a controller blade 902 interfacing the test blades 903 through the backplane 901 to a host computer 160 and a trigger bus 909 within the shared backplane 901. When testing the multi-port device-under-test 906, each of the test ports 100 is connected to a port on the multi-port device-under-test 906 using test cables 170a-170n. When performing calibrations, each of the test ports 100 is connected to a different one of the test ports 100 (e.g., test port 100a to test port 100b) using a test cable 170 assigned to the test port 100 that is being calibrated. In one embodiment, where the multi-port device-under-test 906 is 10/100/ 1000Base-T device, Ethernet test cables 170a-170n, for example TIA/EIA Category 5e, Category 6, or Category 6A patch cables, are used to connect the ports.

In operation, the measurement system 900 is controlled by the computer 160' which directs an automated sequencing of configurations, measurements, and calibrations in response to user input obtained in the user interface 162'. The configurations, measurements, and calibrations are similar to those mentioned above and are further described in conjunction with FIGS. 10-19.

The trigger bus 909 communicates a trigger signal from the controller blade to the plurality of test ports. The trigger bus 909 enables measurements configured on a plurality of test ports 100a-100n to be simultaneously initiated and to execute concurrently in response to system controls, commands, and data 156' from the computer 160'.

Functionality supported by the microcontroller 150 and computer 160, and more particularly, functionality associated with test port 100 will now be discussed via flow diagrams in FIGS. 10-19. For purposes of the following discussion, flow diagrams of particular embodiments of the presently disclosed methods are depicted in FIGS. 10-19. The rectangular elements are herein denoted "processing blocks," and represent computer software instructions or groups of instructions. Diamond shaped elements, are herein denoted "decision blocks," and represent processor instructions or groups of instructions (e.g., computer programming code) which affect the execution of the instructions represented by the processing blocks. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Transmission Characteristic Testing

Figure 10:
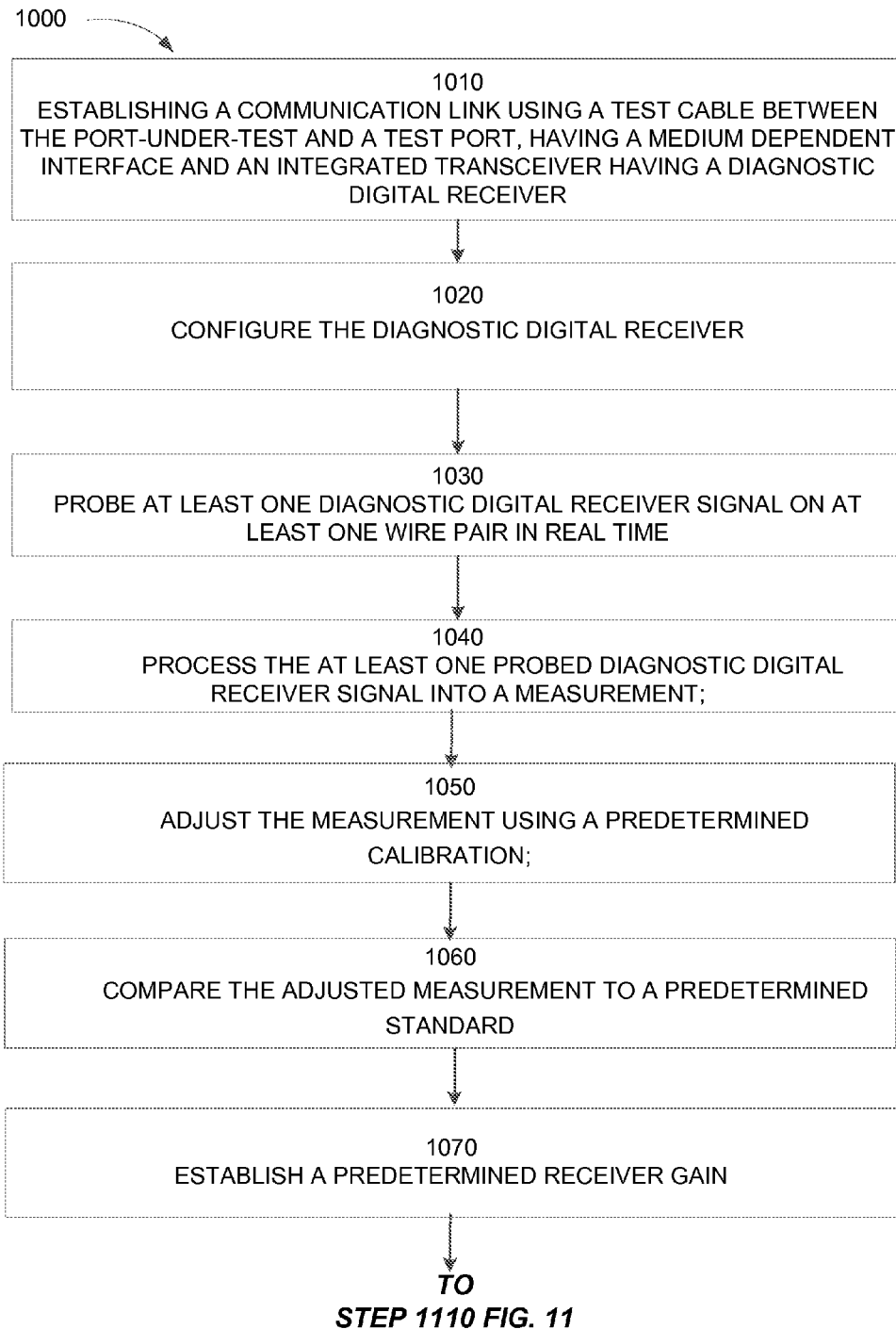
FIGS. 10-15 are flow diagrams illustrating example processes according to embodiments disclosed herein.

Now referring to FIG. 10, a flow diagram 1000 details a process for testing the electrical transmission characteristics of a port-under-test 180 utilizing a test port 100 including integrated transceiver 130 having a diagnostic digital receiver 132 and a medium dependent interface (MDI) 140. Measurements, tests and associated calibration procedures disclosed herein, include, but are not limited to, parametric transmitter signal testing of wideband signal power, power spectral distortion, residual distortion, wideband return loss, and wideband crosstalk. At step 1010, a communications link is established between the test port 100 and the port-under-test 180 using a test cable 170. In general, the significance of the test cable 170 is that measurements performed by the test port 100 are adjusted using calibrations so that those measurements characterize the port-under-test 180 as an entity fully independent from the test port 100 and the test cable 170. At step 1020, the diagnostic digital receiver 132 is configured to a predetermined state. This commonly includes the use of AFE controls 214 to establish a predetermined receiver gain in the analog front end 201. This step assures that measurements, including calibrations, are performed under controlled and repeatable conditions. At step 1030, at least one diagnostic digital receiver 132 signal is probed on at least one wire pair in real time. Step 1030 describes the probing of at least one digital signal in the diagnostic digital receiver 132. The probed signals convey digital information from a wire pair and are captured in real time for processing into measurements. At step 1040, the at least one probed diagnostic digital receiver signal is processed into a measurement.

At step 1050, measurements are adjusted using a predetermined calibration. The measurements are adjusted to improve accuracy by using either factory or local calibrations stored in the microcomputer 150 or computer 160. Calibrations are specialized configurations of measurements performed by the test port 100 in order to characterize the test port 100 and the test cable 170. At step 1060 the adjusted measurement is compared to a predetermined standard. The calibration and adjustments are made in order to produce a port-under-test 180 electrical characteristic of interest in units that facilitate evaluation. In the case of wideband signal power measurements, the "standard" is generally a nominal transmit signal power level. In the case of power spectral distortion, the standard is generally a nominal transmit power (frequency) spectrum. In the case of residual distortion, the "standard" is generally the original transmitted signal power from the port-under-test (as reproduced in the diagnostic digital receiver 132). In the case of wideband return loss and wideband crosstalk, the "standard" is generally the magnitude of transmit power from the test port transmitter. A predetermined receiver gain is established at step 1070, for each of the measurements described in FIGS. 11-12. In one embodiment, steps 1030, 1040, 1050, and 1060 are repeated for each wire pair tested.

Figure 11:
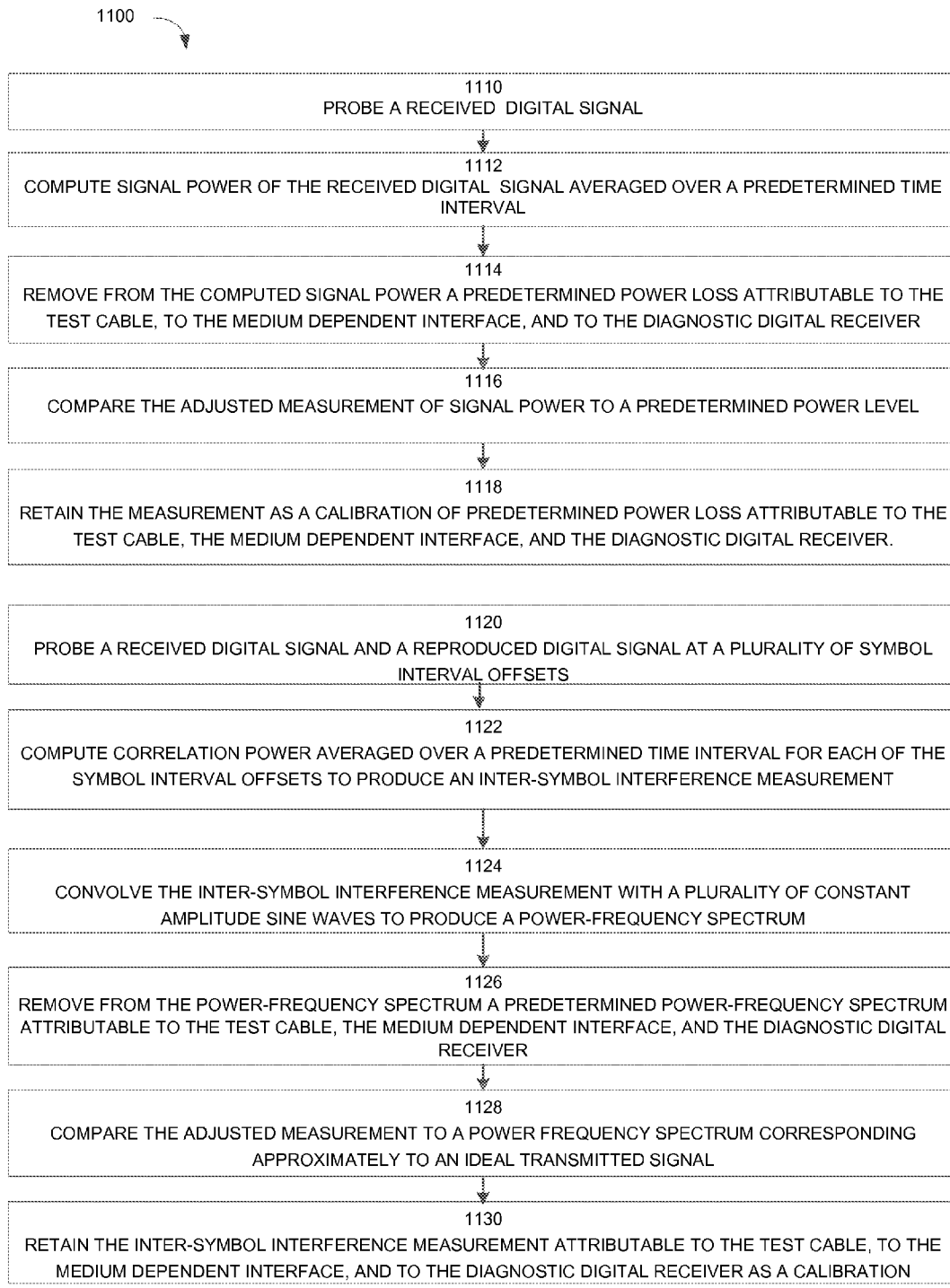
Figure 12:
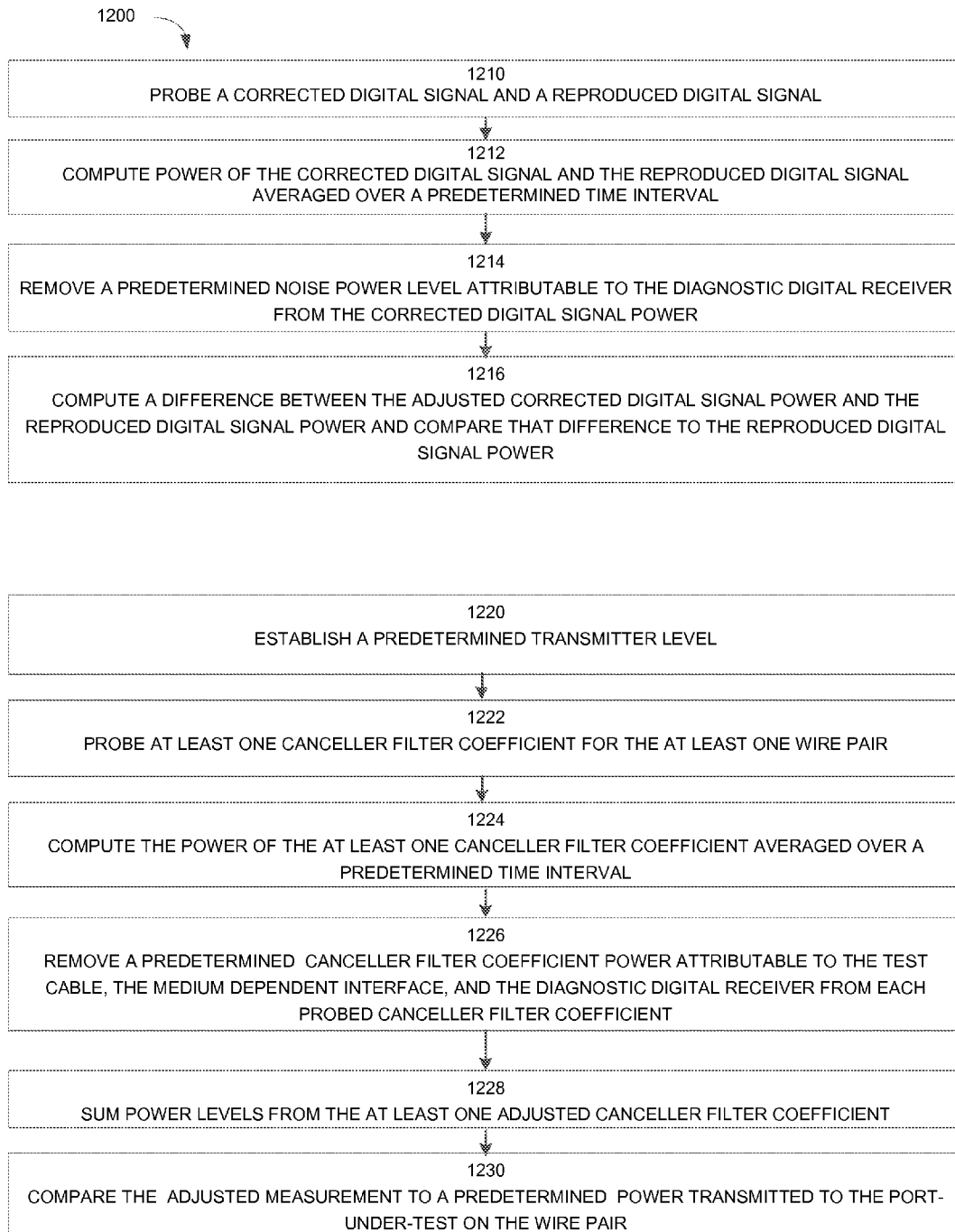

Processing unique to specific transmission characteristic measurements is further described in FIGS. 11-12. Now referring to FIG. 11, a flow diagram 1100 details additional steps in a process to test electrical characteristics the transmitted signals from a port-under-test 180. One embodiment includes the measurement of wideband signal power of a port-under-test 180. At step 1110, the received digital signal 207 is probed. At step 1112, a signal power of the received digital signal 207 averaged over a predetermined time interval is computed. At step 1114, a predetermined power loss attributable to the test cable 170, to the medium dependent interface 140, and to the diagnostic digital receiver 132 is removed from the computed signal power, and at step 1116 the adjusted measurement of computed signal power is compared to a predetermined power level. Finally at step 1118, the measurement as a calibration of predetermined power loss attributable to the test cable 170, the medium dependent interface 140, and the diagnostic digital receiver 132 is retained. Step 1118 is executed when calibrating a test port 100 and test cable 170 and here, the port-under-test 180 is configured as an ideal transmitter transmitting nominal power signals on at least one wire pair. Here "ideal transmitter" does not refer to a perfect transmitter but rather to a transmitter with properties defined in a standard (e.g. IEEE 802.3).

A process to measure power spectral distortion continues at step 1120, where probing the at least one diagnostic digital receiver signal includes probing a received digital signal 207 and a reproduced digital signal 209 at a plurality of symbol interval offsets. At step 1122 correlation power averaged over a predetermined time interval for each of the plurality of symbol interval offsets is computed to produce an inter-symbol interference measurement and the inter-symbol interference measurement is mathematically convolved with a plurality of constant amplitude sine waves to produce a power-frequency spectrum at step 1124. At step 1126, a predetermined power-frequency spectrum attributable to the test cable 170, the medium dependent interface 140, and the diagnostic digital receiver 132 is removed from the power-frequency spectrum, and the adjusted measurement is compared to a power frequency spectrum corresponding approximately to an ideal transmitted signal. Finally at step 1130, the inter-symbol interference measurement attributable to the test cable, to the medium dependent interface, and to the diagnostic digital receiver 132 is retained. Step 1130 is executed when calibrating a test port 100 and the port-under-test 180 is configured to transmit a nominal power-frequency spectrum.

Now referring to FIG. 12, a flow diagram 1200 details additional steps in a process to test electrical characteristics the transmitted signals from a port-under-test 180. In one embodiment, residual distortion of transmitted signals from a port-under-test 180 is measured. At step 1210 a corrected digital signal 208 and a reproduced digital signal 209 are probed. At step 1212, power of the corrected digital signal 208 and the reproduced digital signal 209 averaged over a predetermined time interval is computed. At step 1214 a predetermined noise power level attributable to the diagnostic digital receiver 132 is removed from the corrected digital signal power and at step 1216 a difference between the adjusted corrected digital signal power and the reproduced digital signal power is computed and that difference is compared to the reproduced digital signal power.

The process to measure wideband return loss and wideband crosstalk continues at step 1220, where a predetermined test port 100 transmitter level is established. At step 1222, at least one canceller filter coefficient 211 for at least one wire pair is probed. The power of the at least one canceller filter coefficient 211 averaged over a predetermined time interval is computed at step 1224. At step 1226, a predetermined canceller filter coefficient power attributable to the test cable 170, the medium dependent interface 140, and the diagnostic digital receiver 132 is removed from each probed canceller filter coefficient power level and at step 1228, power levels from the at least one adjusted canceller filter coefficient are mathematically summed. Finally, the adjusted measurement is compared to a predetermined power transmitted to the port-under-test 180 on the wire pair at step 1230.

Figure 13:
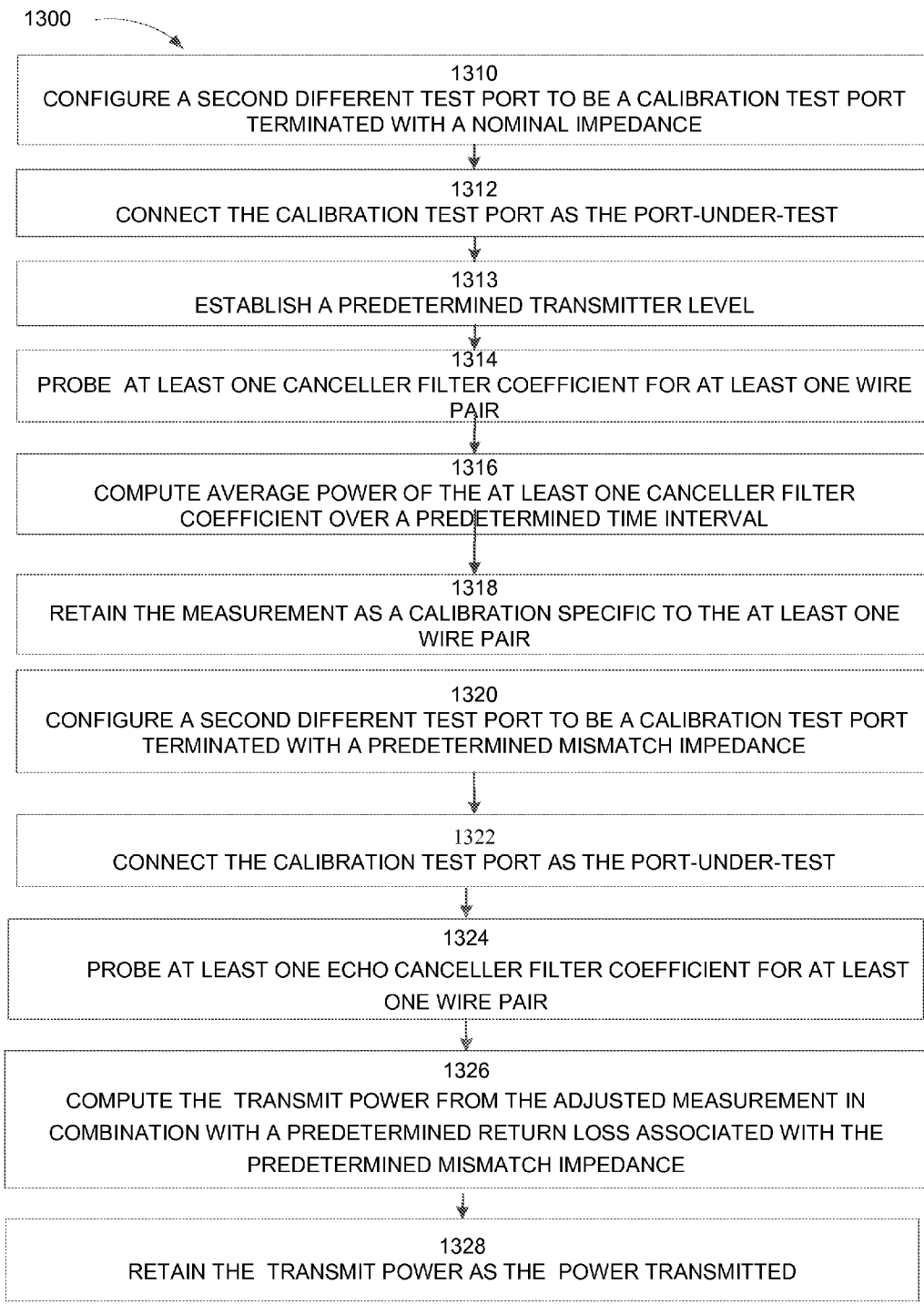

Now referring to FIG. 13, a flow diagram 1300 details processes related to using a test port 100 as a calibration test port 100'. At step 1310, a second different test port is configured to be a calibration test port 100' terminated with a nominal impedance and at step 1312, the calibration test port 100' is connected as the port-under-test 180 using the test cable 170. At step 1313, a predetermined test port 100 transmitter level is established and at step 1314, at least one canceller filter coefficient 211 for at least one wire pair is probed. At step 1316, the power of the at least one canceller filter coefficient 211 averaged over a predetermined time interval is computed and at step 1318, the measurement is retained as a calibration specific to at least one wire pair and in one embodiment, this computation is retained as a measure of the return loss or crosstalk attributable to the test cable 170, the medium dependent interface 140, and the diagnostic digital receiver 132.

Another use of the test port 100 starts at step 1320 where a second different test port 100 is configured to be a calibration test port 100' terminated with a predetermined mismatch impedance. At step 1322, the calibration test port 100' is connected as the port-under-test 180, and at least one echo canceller filter coefficient 211 is probed within the diagnostic digital receiver 132 for at least one wire pair at step 1324. At step 1326 test port 100 transmit power is computed from the adjusted measurement in combination with a predetermined return loss associated with the predetermined mismatch impedance. At step 1328, the transmit power is retained as the power transmitted.

Receiver Characteristic Testing

Now referring to FIG. 14, a flow diagram 1400 illustrates a process for testing the electrical characteristics of a port-under-test 180 including receiver characteristics. At step 1410, a communications link is established between the test port 100 and the port-under-test 180. The test port 100 includes a medium dependent interface 140 that includes a wideband impairment coupler 142. At step 1420, at least one pre-characterized physical layer impairment is applied to at least one wire pair in the communications link. A physical layer impairment includes a characteristic that adversely affects the quality and integrity of an electrical signal and thus places added burden on a receiver of the port-under-test 180 that is attempting to recover the originally transmitted information without errors. The application of a physical layer impairment to at least one wire pair includes, but is not limited to, selectively switching electronic components into a circuit through which the transmitted signal passes, using a circuit to combine a transmitted signal with an impairing signal, and modifying at least one characteristic of the transmitted signal in such a way that it deviates from a nominal transmitted signal. The wideband impairment coupler 142 facilitates the application of at least one category of physical layer impairment on at least one wire pair in an embodiment where the physical layer impairment is applied within the test port 100. At step 1430, at least one status indication is obtained from the integrated transceiver and the at least one status indication from the integrated transceiver is analyzed at step 1440. Finally, disruption of integrity and stability of the communication link caused by at least one pre-characterized physical layer impairment is determined from the at least one status indication. These steps perform a measurement of link stability to assess the ability of the port-under-test 180 to operate in the presence of the physical layer impairment. Link stability is generally a measure of the integrity of the communication link over a period of time. The measurement of link stability includes the instantaneous sampling of an indicator at regular intervals followed by the tabulation of successful samples as compared to total samples over an arbitrary time period. The link stability determination is typically insensitive to the presence or absence of packet traffic flowing on the communication link and is utilized, in combination with the physical layer impairments, to evaluate receiver performance characteristics in the port-under-test 180.

Now referring to FIG. 15, flow diagram 1500 illustrates further details of the receiver testing process of FIG. 14 including four categories of physical layer impairment that may be asserted in any combination. At step 1510, a predetermined passive line insertion loss replicating a worst case channel insertion loss is applied to at least one wire pair. In one embodiment, the predetermined passive line insertion loss is the passive insertion loss impairment circuit 604. In an Ethernet 10/100/1000 embodiment, the predetermined passive line loss is specified by the IEEE 802.3 standard and has the approximate characteristics of insertion gain vs. frequency 710. At step 1520, an adjustable level of frequency contoured noise, to approximate a nominal power spectrum of transmission signals is applied to at least one wire pair. The application of noise on a wire pair refers to the mathematical addition of transmitted signal power and noise power. The noise power is frequency contoured to better simulate the types of signals that are commonly found in the physical environment of the communication link and therefore are most likely to cause impairment to an arbitrary transmitted signal. In an Ethernet 10/100/1000 embodiment, the power spectral shape is that of a 100Base-Tx Idle 302 signal and the range of adjustable levels includes 25 mVpeak-peak and 40 mVpeak-peak as measured at the port-under-test 180.

At step 1530, an adjustable random transmission symbol timing modulation having a predetermined modulation frequency spectrum is applied to all transmitting wire pairs. Symbols are the fundamental unit of information conveyed on a wire pair and are conveyed as discrete signal values. Random timing modulation is commonly referred to as signal jitter. In an Ethernet 10/100/1000 embodiment, the adjustable range includes 1.4 nsec peak-peak and the modulation frequency spectrum attenuates modulations above 5 KHz.

At step 1540, an adjustable symbol frequency offset from nominal symbol rate is applied to all transmitting wire pairs. Receivers within a port-under-test 180 are commonly designed to expect a predetermined rate of incoming symbols. This predetermined rate, and any tolerance to either side of this predetermined rate, is commonly specified by a published industry specification governing characteristics of the communication link. In and Ethernet 10/100/1000Base-T embodiment, the predetermined rate of incoming symbols is 125 MHz and the symbol frequency adjustment range includes both positive and negative 50 parts per million and 100 parts per million relative to that nominal symbol transmission frequency.

Obtaining at least one status indication from the integrated transceiver at step 1430 includes two methods. At step 1550, a remote receiver error indicator 609 is sampled for the measurement of link stability. This indicator exists within the test port 100 only if the technology deployed in the communication link provides a mechanism for a port-under-test 180 to signal back to a test port 100 that the receiver in the port-under-test 180 is experiencing problems in the recovery of digital information transmitted by the test port 100. The remote receiver error indicator 609 advantageously reflects that the implied location of a given problem is within the port-under-test 180 and it offers a second advantage in that it can change its value while the communication link is operating. At step 1560, a link status indicator 608 is sampled. The link status indicator 608 exists within the test port 100 only if the technology deployed in the communication link provides a mechanism for the test port to become aware of total malfunction of the communication link. The link status indicator 608 reports whether the communication link, as perceived by the test port 100, is presently viable. As such, it does not convey information about the location of a link problem.

FIGS. 16-19 are flow diagrams describing further detail of specific measurements as disclosed herein including the wideband signal power measurement, the power spectral distortion measurement, the residual distortion measurement, the wideband return loss measurement, and the wideband crosstalk measurement.

Wideband Signal Power Measurement

Figure 16:
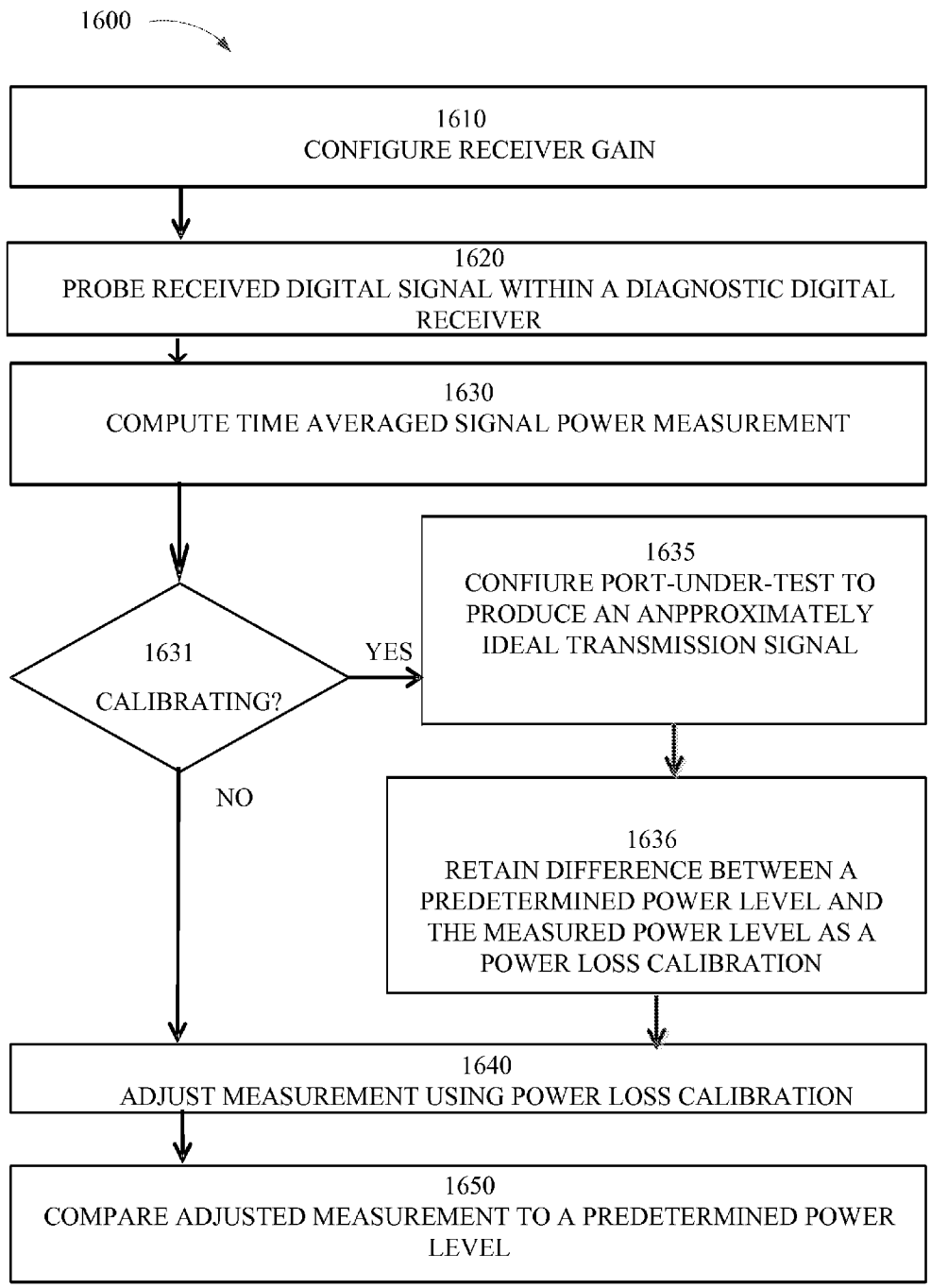
FIG. 16 is a flow diagram illustrating the measurement of wideband signal power according to embodiments disclosed herein.

Referring to FIG. 16, flow diagram 1600 describes a method for the measurement of wideband signal power is described. At step 1610 a predetermined receiver gain is configured and replicated during calibrations and actual measurements of a port-under-test 180. Any automatic gain control mechanisms of the diagnostic digital receiver 132 are disabled and the gain is configured to a level known to accept a wide range of incoming signal levels. At step 1620, the received digital signal 207 (i.e., the received signal immediately following digitization) is probed. Next at step 1630, the received digital signal 207 is processed into a signal power measurement. In one embodiment, the mathematical square of each sample of the incoming digital signal voltage is computed and then the computed power samples are averaged over a fixed number of samples in order to null out short term variations in power related to data patterns embedded in the received signal. In another embodiment, the autocorrelation of the received digital signal 207 is computed with no symbol timing offset resulting in signal power. Averaging occurs in the autocorrelation given that many symbols are analyzed.

When testing a port-under-test 180, the measured power level must be adjusted to compensate unknown characteristics of the test cable 170 and the test port 100, including characteristics of the medium dependent interface 140 and the integrated transceiver 130. At step 1631, it is determined whether the test port 100 is being used for calibration. If the test port 100 is being used for calibration processing continues at step 1635 and if not then processing continues at step 1640.

At step 1640, an adjustment using a previously acquired calibration of power loss gathered while testing an approximately ideal transmission signal is performed. In an embodiment where the calibration is in units of decibels of power loss, the signal power measurement is scaled by the calibrated power loss so that adjusted signal power is the measured signal power divided by $10^{(calibrated\ power\ loss/10)}$. At step 1650, the adjusted signal power is compared to a predetermined wideband signal power level that is identical to a reference level utilized during calibration.

The calibration required for the wideband signal power measurement continues at steps 1635 and 1636. First, at step 1635, the port-under-test 180 becomes a port that is transmitting approximately ideal transmission signals that have approximately ideal wideband signal power. At step 1636, the signal power measurement is compared to a predetermined power level that is also utilized in the final measurement comparison that occurs at step 1650. While this predetermined power level is arbitrary in value, it is advantageous to use a value that is close to the expected signal power measurement given an approximately ideal transmission signal. In an embodiment where the calibration is in units of decibels of power loss, the calibration is calculated as ten times the base 10 logarithm of the mathematical ratio of measured signal to predetermined power level.

Referring again to FIG. 3, wideband signal power represents the band power of all received signal energy across the frequency spectrum from zero to at least 100 MHz, as measured at the port-under-test on a single wire pair. In one embodiment, wideband signal power is measured in an absolute unit such as dBm where the reference standard is measured in milliwatts. In another embodiment, wideband signal power is measured in relative units of dB (nominal) where the reference standard is the nominal, approximately ideal level of transmission signal power. In this embodiment, a zero dB (nominal) measurement indicates that the measured signal is equivalent to nominal transmission power; a negative value indicates that the measured signal is below nominal transmission power, and a positive measurement indicates that the measured signal is above nominal transmission power.

In one embodiment in which the test port 100 measures wideband signal power, the analog front end 201 of the diagnostic digital receiver 132 is configured to a predetermined receiver gain utilizing AFE controls 214. The received digital signal 207 is then probed by the differential power detector 205. The differential power detector 205 performs autocorrelation of the received digital signal 207 to compute the signal power averaged over many symbols, thus producing the signal power measurement. This measurement is available to the microcontroller 150 and the computer 160. The measurement is then adjusted by the computer to compensate the power loss effects of the test cable 170, the medium dependent interface 140, and the diagnostic digital receiver 132. The adjustment utilizes a power loss calibration maintained in test port storage 152. The wideband signal power measurement is then completed in the computer 160 by comparing the adjusted signal power measurement to a predetermined reference power with the result presented in dB (nominal). In an Ethernet embodiment of the wideband signal power measurement, wideband signal power is measured on one pair if the communication link is 100Base-T and four pairs if the communication link is 1000Base-T.

Power Spectral Distortion Measurement

Figure 17:
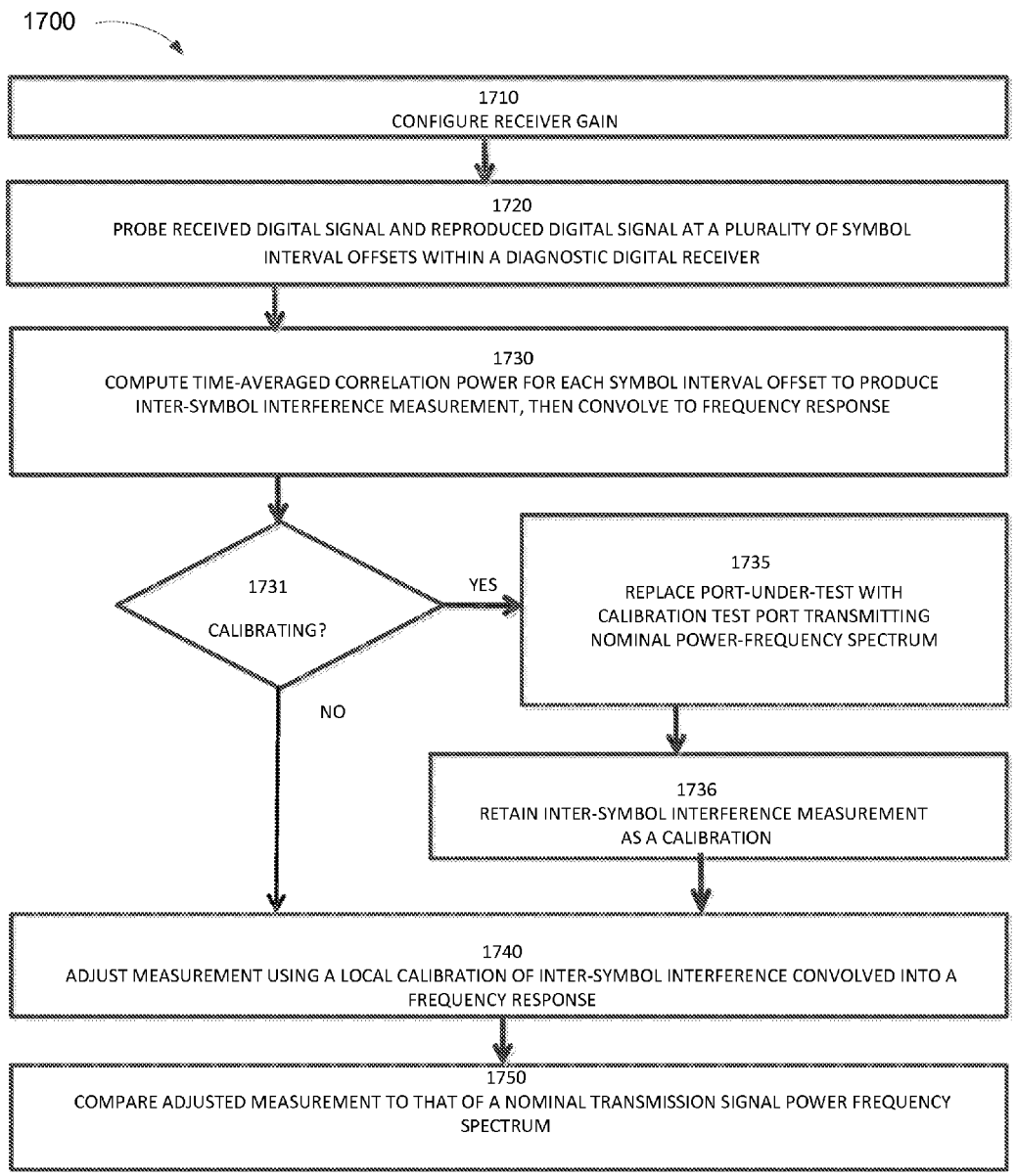
FIG. 17 is a flow diagram illustrating the measurement of power spectral distortion according to embodiments disclosed herein.

Referring to FIG. 17, flow diagram 1700 describes a method for the measurement of power spectral distortion is described. Starting at step 1710 a predetermined receiver gain is configured and replicated in both calibrations and actual measurements of a port-under-test 180. Any automatic gain control mechanisms of the receiver are disabled and that the gain is configured to a level that is known to accept a wide range of incoming signal levels. At step 1720 the degree of inter-symbol interference present within the measured signal is assessed. Inter-symbol interference represents the spreading in time of digital symbol power as signals with discrete level transitions, or symbols, pass through frequency and phase selective communication media.

Referring again to FIG. 7 depicts the insertion gain versus frequency 710 characteristics of such a medium. Large amounts of frequency selective attenuation such as shown in FIG. 7 produce large amounts of inter-symbol interference. Digital receivers are designed to correct for this predictable form of distortion as they attempt to accurately regenerate the original transmitted signal by removing inter-symbol interference. Therefore, the magnitude of inter-symbol interference can theoretically be discerned by probing and comparing the received digital signal 207 and the reproduced version of the originally transmitted signal, herewith referred to as the reproduced digital signal 209, collecting these signals with various symbol interval time offsets as presented at step 1720. At the next step 1730, the received digital signal 207 is cross correlated with the reproduced digital signal 209 at each symbol interval offset to produce a series of correlation power points spaced at regular time intervals. This measurement of inter-symbol interference is then convolved with a plurality of sinusoidal waveforms to produce a power-frequency spectrum. The upper bandwidth of the power-frequency spectrum measurement is limited by the time spacing of the inter-symbol interference measurement points while the lower bandwidth is limited by the total time separation between the first inter-symbol interference measurement point and the last inter-symbol interference measurement point. As an example, a symbol interval offset of one 8 nsec Ethernet 1000Base-T symbol period provides an upper frequency limit of 62.5 MHz and a symbol interval offset of 4 nsec, or Ethernet 1000Base-T symbol period, provides 125 MHz of bandwidth to the power-frequency spectrum measurement.

At step 1731, it is determined whether the test port 100 is being used for calibration. If the test port 100 is being used for calibration processing continues at step 1735 and if not then processing continues at step 1740. When testing a port-under-test 180, the measured power-frequency spectrum is adjusted to compensate unknown characteristics of the test cable 170 and the test port 100, including characteristics of the medium dependent interface 140 and the integrated transceiver 130. At step 1740, the measurement using a previously acquired calibration of inter-symbol interference gathered is adjusted while testing a near-nominal transmission signal. Because the calibration is in the form of an inter-symbol interference measurement, it can be convolved with the same frequencies utilized in the measurement to produce a calibration power-frequency spectrum that is subtracted from the measured power-frequency spectrum. Finally, at step 1750, the adjusted power-frequency spectrum is compared to an ideal power-frequency spectrum to where the difference becomes a measurement of power spectral distortion.

The calibration for power spectral distortion continues at steps 1735 and 1736. First at step 1735, the port-under-test 180 becomes a pre-characterized port transmitting a nominal, approximately ideal power-frequency spectrum. At step 1736, the measured inter-symbol interference is retained such that it can be readily recalled during power spectral distortion measurements and utilized at step 1740.

In one embodiment of the test port 100 for measuring power spectral distortion, a predetermined receiver gain is configured in the analog front end 201 of the diagnostic digital receiver 132 by the microcontroller. The differential power detector 205 within the diagnostic digital receiver 132 probes the received digital signal 207 and the reproduced digital signal 209 and then produces cross correlation power calculations at a plurality of symbol interval offsets configured by the microcontroller 150. Symbol interval offsets are selected to maintain over 100 MHz of measurement bandwidth in the power-frequency spectrum measurement. A plurality of correlation power values are collected by the microcontroller 150, forming the inter-symbol interference measurement, for further processing into a power-frequency spectrum in the computer 160.

The power-frequency spectrum is then adjusted using a power-frequency spectrum computed from an inter-symbol interference measurement performed earlier using a port-under-test that produces a nominal power-frequency spectrum and nominal wideband signal power. This adjustment is performed either in the microcontroller 150 or the computer 160. The resulting power-frequency spectrum represents the deviation between the measured power-frequency spectrum and a near-ideal power-frequency spectrum that was utilized during calibration, thereby producing the power spectral distortion measurement.

Referring again to FIG. 5, the calibration test port 100' is used for power spectral distortion calibration. The purpose of this calibration is to compensate for the unknown power-spectral characteristics of the diagnostic digital receiver 132, including the analog front end 201, the medium dependent interface 140, including the wideband impairment coupler 142, and the test cable 170. In operation a second test port 100 is configured as a calibrating test port 100' where AFE controls 214' are utilized to configure a predetermined transmit level and transmit slew rate within the analog front end 201'. These predetermined settings are selected to produce a near-nominal power-frequency spectrum in the transmitted signals. The computer 160 directs the test port 100 to perform the wideband signal power measurement so that the computer can adjust AFE controls 214' to the analog front end 201' in the calibrating test port 100' to more precisely replicate a nominal transmit power spectrum. The test port 100 then performs the inter-symbol interference measurement and the results are retained as the calibration. This process is repeated for each wire pair. In one embodiment, calibrations are retained on the computer 160. In another embodiment, calibrations are retained in test port 100 storage 152.

Residual Distortion (SNR) Measurement

Another measurement of interest in the testing of 100Base-Tx and 1000Base-T transmitted signals is residual distortion, or more commonly, the signal-to-noise ratio (SNR). In a digital communications system, this ratio bears a direct relationship to the probability or frequency of bit errors occurring within a receiver. The term, residual distortion, signifies that the noise component in the ratio of signal to noise power only includes those noise or distortion elements of an incoming signal that cannot be corrected or removed by digital signal correction functions in a digital receiver. In this embodiment, residual distortion is reported in decibels and constitutes the mathematical ratio of originally transmitted signal power to residual noise power.

Figure 18:
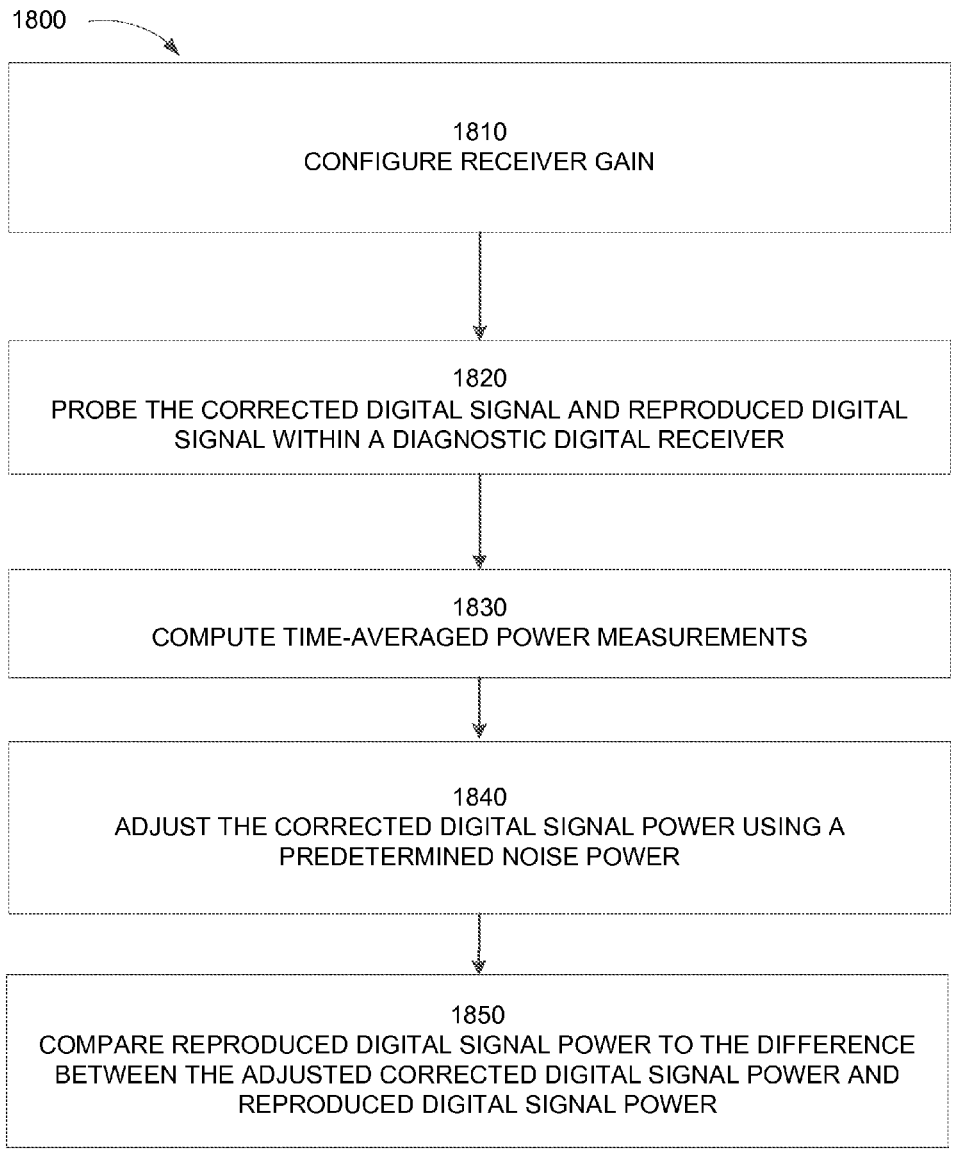
FIG. 18 is a flow diagram illustrating the measurement of residual distortion according to embodiments disclosed herein.

Referring to FIG. 18, a method for the measurement of residual distortion is described. The first step 1810 to is to establish a predetermined receiver gain that is replicated during calibrations and actual measurements of a port-under-test 180. This means that any automatic gain control mechanisms of the receiver must be disabled and that the gain is configured to a level that is known to accept a wide range of incoming signal levels. The next step 1820 is to probe two signals from within a digital receiver. First is the corrected digital signal 208, that is, the received signal after application of various digital signal correction processes that remove predictable forms of signal distortion including inter-symbol interference, echo, near-end crosstalk, and baseline wander, each of which are phenomenon well known to those who are practiced in the art of digital receivers. Second is the reproduced digital signal 209 that is a reproduction of the transmitted signal. In the following step 1830, each signal is processed into a power level averaged over a period of time to create measurements of the corrected digital signal power and reproduced digital signal power. This is accomplished by collecting a finite number of samples of each signal, computing the mathematical square of each of the samples for each of the signals, and then mathematically averaging that finite number of samples. The number of samples averaged must be large enough to null out short term variations in power related to data patterns embedded in the received signal.

At step 1840, an adjustment is performed on the corrected digital signal power to remove noise power added within the diagnostic digital receiver 132. This adjustment reduces the corrected digital signal power by a predetermined level of noise power known to exist within the diagnostic digital receiver 132 at the predetermined receiver gain established at step 1810. At step 1850, two computations are performed. First, a measurement of residual noise power is determined by subtracting the reproduced digital signal power from the adjusted corrected digital signal power. Second, a mathematical ratio of reproduced digital signal power to residual noise power is calculated to produce the residual distortion measurement, also referred to as the SNR measurement.

In one embodiment, in which the test port 100 measures residual distortion, the analog front end 201 of the diagnostic digital receiver 132 is configured to a predetermined receiver gain utilizing AFE controls 214. The corrected digital signal 208 and the reproduced digital signal 209 are each probed by the differential power detector 205. The differential power detector 205 converts both signals to power levels averaged over many symbols, thus producing the measurements of corrected digital signal power and reproduced digital signal power. These measurements now become available to the microcontroller 150 and the computer 160. The corrected digital signal power measurement is adjusted by the computer 160 to compensate for the analog and digital noise added by the diagnostic digital receiver 132 at the predetermined receiver gain established in the analog front end 201, thereby producing the residual noise power. Finally, the computer 160 calculates the residual distortion as the mathematical ratio of reproduced digital signal power to residual noise power.

Wideband Return Loss and Crosstalk Measurements

Two additional measurements of interest in the evaluation of a port-under-test 180 are wideband return loss and wideband crosstalk. Both of these measurements relate to the contribution of signal power originating in the test port transmitters to at least one incoming receiver signal. More specifically, wideband return loss is a measurement of the portion of power transmitted from the test port 100 on a particular wire pair that can be detected in the incoming received signal on that same wire pair and wideband crosstalk is a measurement of the port of power transmitted from the test port 100 that can be detected in the incoming received signal on a different wire pair. As a measurement, wideband return loss reports the power reflected on a particular wire pair in reference to the magnitude of power transmitted on that same wire pair and in one embodiment is presented in decibels (dB). As a measurement, wideband crosstalk reports the magnitude of power coupled from a second wire pair to a first wire pair in reference to the power transmitted on that second wire pair and in one embodiment is presented in decibels (dB). When reported in units of decibels, a zero decibel measurement indicates 100% of the transmitted power appears in the received power.

In an embodiment in which the port-under-test 180 is a 10/100/1000Base-T Ethernet test port, there are four wire pairs meaning that wideband return loss can be performed for each of the four wire pairs, that is pair 1, pair 2, pair 3, and pair 4, while wideband crosstalk evaluates six wire pair combinations, that is, pair 1 to pair 2, pair 2 to pair 3, pair 1 to pair 4, pair 2 to pair 3, pair 2 to pair 4, and pair 3 to pair 4. Because crosstalk is assumed to occur as a result of passive coupling, a crosstalk measurement in the reverse direction, for example pair 4 to pair 3, is considered to be exactly equivalent to a crosstalk measurement from pair 3 to pair 4, and therefore is completely redundant.

Figure 19:
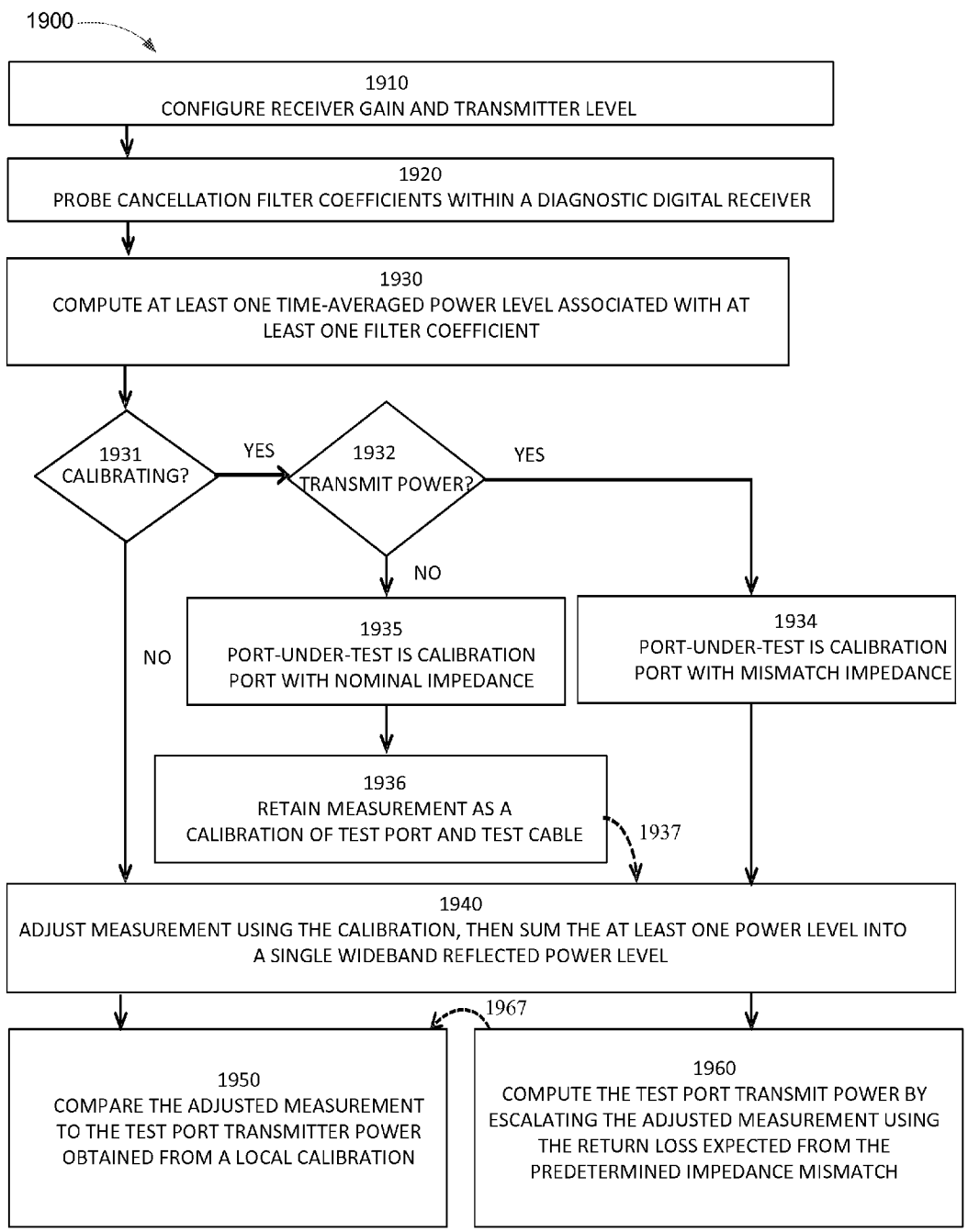
FIG. 19 is a flow diagram illustrating the measurement of wideband return loss and wideband crosstalk according to embodiments disclosed herein.

Now referring to FIG. 19, a method for the measurement of wideband return loss and wideband crosstalk is described. Dotted lines in FIG. 19 refer to the recalling of calibration data that is prerequisite to completing measurements on a port-under-test 180. Starting at step 1910, a predetermined receiver gain and a predetermined test port 100 transmit level are configured in the integrated transceiver 130. Any automatic gain control mechanisms of the receiver are disabled and that the gain is configured to a level that is known to accept a wide range of incoming signal levels. The test port 100 transmit power is configured to a level that is replicated during calibrations associated with measurements of wideband return loss and wideband crosstalk as described below in step 1935. This same level of transmit power is also configured when performing the test port 100 transmit power measurement described below in step 1934.

At step 1920, one embodiment of the measurement of wideband return loss and wideband crosstalk, a canceller filter 215 is probed to recover at least one canceller filter coefficient 211. In this embodiment, the diagnostic digital receiver 132 tunes canceller filters 215 as it adapts to and corrects for signal power originating from any of the integrated transceiver 130 transmitters. Canceller filters 215 are utilized to overcome a predictable form of received signal impairment. The canceller filters 215 produce at least one filter coefficient that indicate the magnitude of signal correction necessary to overcome received signal impairment, and therefore, indicate the magnitude of the transmitted signal that appears in the received signal. Canceller filters 215 typically produce a plurality of filter coefficients in order to enhance the accuracy of the signal correction given a wide variety of signal distortions (i.e., the total magnitude of correction performed is distributed to a plurality of coefficients). At step 1930, each probed canceller filter coefficient 211 is converted into a power level by computing the mathematical square of the coefficient value. Canceller coefficients are sampled over a finite time interval and mathematically averaged after the power computation providing a measurement of canceller power including at least one averaged power coefficient.

At step 1931, it is determined whether the test port 100 is being used for calibration. If the test port 100 is being used for calibration, processing continues at step 1932 and if not then processing continues at step 1940. At step 1932, it is determined if the calibration type is a canceller filter coefficient 211 calibration or a test port 100 transmitter power measurement. Processing associated with each of these calibration types is described below.

Next at step 1940, the measurement of canceller power is adjusted to correct for contributions of canceller power caused by the test cable 170, the medium dependent interface 140, and the diagnostic digital receiver 132 within the integrated transceiver 130. This correction is performed by obtaining a predetermined calibration in the form of canceller power and reducing the magnitude of the measured canceller power by the magnitude of the calibration. Once the correcting adjustment is applied, a summation is performed on all of the adjusted average power coefficients so that one value of total adjusted coefficient power is computed. At step 1950, the total adjusted coefficient power is converted to a wideband measurement of return loss or crosstalk by comparing it to a reference power representing the transmitted power on the appropriate wire pair. This result is reported in decibels by computing ten times the base 10 logarithm of the ratio of total adjusted coefficient power to the transmitted power.

Steps 1936 and 1937 describe the calibration that is made to compensate for the test cable 170, the medium dependent interface 140, and the diagnostic digital receiver 132 within the integrated transceiver 130. At step 1335, the port-under-test 180 is a pre-characterized port configured with a nominal input impedance. In an Ethernet 10/100/1000Base-T embodiment, each wire pair is terminated in a nominal 100 ohms. It is understood that the analog front end 201 within the diagnostic digital receiver 132 possesses the exact same configuration previously described at step 1910. At step 1936, the measured canceller power is retained in a manner where it can be recalled during testing of a port-under-test 180.

Steps 1934 and 1960 describe a method for the measurement of test port 100 transmit power that is then used as a reference power for computing wideband return loss and wideband crosstalk at step 1950. At step 1934, the port-under-test 180 is a pre-characterized port configured with a predetermined mismatch impedance. The mismatch impedance is selected so that an ordinary return loss measurement performed on the pre-characterized port produces a significant and constant return loss between 1 MHz and 100 MHz. In an Ethernet 10/100/1000Base-T embodiment, each wire pair is terminated in a resistive value significantly different than 100 ohms. It is understood that the analog front end 201 within the diagnostic digital receiver 132 possesses the exact same configuration previously described at step 1910. The measured canceller power is then adjusted at step 1940 to correct for contributions of canceller power caused by the test cable 170, the medium dependent interface 140, and the diagnostic digital receiver 132 within the integrated transceiver 130. At step 1960, the test port 100 transmit power is calculated by scaling the adjusted measurement from step 1940 using the return loss value associated with the predetermined impedance mismatch of the pre-characterized port. This scaling is accomplished by dividing the adjusted measurement by ten raised to the power of one tenth of the return loss value associated with the predetermined impedance mismatch.

In one embodiment in which the test port 100 measures wideband return loss, the analog front end 201 of the diagnostic digital receiver 132 is configured to a predetermined receiver gain and a predetermined transmit level utilizing AFE controls 214. At least one canceller filter coefficient 211 is sampled at least once from an echo canceller within the canceller filters 215 and associated with a wire pair. The measurement of canceller power is formed in the computer 160 by processing the canceller filter coefficients 211 into average power levels. The computer 160 then accesses the predetermined calibration associated with the wire pair and applies the adjustment to form total adjusted coefficient power whereupon the computer then accesses the predetermined transmit power and computes the ratio of total adjusted coefficient power to the predetermined transmit power, thus producing the wideband return loss measurement.

In another embodiment in which the test port 100 measures wideband crosstalk, the analog front end 201 of the diagnostic digital receiver 132 is configured to a predetermined receiver gain and a predetermined transmit level utilizing AFE controls 214. At least one canceller filter coefficient 211 is sampled at least once from a crosstalk canceller within the canceller filters 215 and associated with a wire pair combination. The measurement of canceller power is formed in the computer 160 by processing the canceller filter coefficients 211 into average power levels. The computer 160 then accesses the predetermined calibration associated with the wire pair combination and applies the adjustment to form total adjusted coefficient power whereupon the computer then accesses the predetermined transmit power and computes the ratio of total adjusted coefficient power to the predetermined transmit power, thus producing the wideband crosstalk measurement.

It is understood, that the embodiments described above can be implemented as a standalone instrument performing individual tests, a combined test instrument performing multiple tests or a test system combining multiple test ports 100 and used to test a multi-port device-under-test 906.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs including computer readable instructions that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. Aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microcontroller", or "the microcontroller," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method to test electrical characteristics of a port-under-test, the method comprising:
    establishing a communication link to the port-under-test using a test cable connected between the port-under-test and a test port, having a medium dependent interface (MDI) and an integrated transceiver having a diagnostic digital receiver;
    configuring the diagnostic digital receiver;
    probing at least one diagnostic digital receiver signal originating from the port-under test over at least one wire pair within the test cable while maintaining the communications link to the port-under test;
    processing the at least one probed diagnostic digital receiver signal into a measurement;
    adjusting the measurement to remove from the measurement at least one predetermined power characteristic associated with at least one of:
    the test cable;
    the MDI; and
    the diagnostic digital receiver; and
    comparing the adjusted measurement to a predetermined standard for the port-under-test.

2. The method of claim 1, wherein configuring the diagnostic digital receiver comprises establishing a predetermined receiver gain;
    wherein probing the at least one diagnostic digital receiver signal comprises probing a received digital signal;
    wherein processing the at least one probed diagnostic digital receiver signal into a measurement comprises computing signal power of the received digital signal averaged over a predetermined time interval;
    wherein adjusting the measurement to remove from the measurement at least one predetermined power characteristic comprises removing from the computed signal power a predetermined power loss attributable to the test cable, to the medium dependent interface, and to the diagnostic digital receiver; and
wherein comparing the adjusted measurement comprises comparing the adjusted measurement of computed signal power to a predetermined power level.

3. The method of claim 2, wherein the port-under-test comprises an ideal transmitter transmitting nominal power signals on at least one wire pair; and
further comprising retaining the measurement as a calibration of predetermined power loss attributable to the test cable, the medium dependent interface, and the diagnostic digital receiver.

4. The method of claim 1, wherein configuring the diagnostic digital receiver comprises establishing a predetermined receiver gain;
wherein probing the at least one diagnostic digital receiver signal comprises probing a received digital signal and a reproduced digital signal at a plurality of symbol interval offsets;
wherein processing the at least one probed diagnostic digital receiver signal into a measurement comprises:
computing correlation power averaged over a predetermined time interval for each of the plurality of symbol interval offsets to produce an inter-symbol interference measurement;
convolving the inter-symbol interference measurement with a plurality of constant amplitude sine waves to produce a power-frequency spectrum;
wherein adjusting the measurement to remove from the measurement at least on predetermined power characteristic comprises removing from the power-frequency spectrum a predetermined power-frequency spectrum attributable to the test cable, the medium dependent interface, and the diagnostic digital receiver; and
wherein comparing the adjusted measurement comprises comparing the adjusted measurement to a power frequency spectrum corresponding approximately to an ideal transmitted signal.

5. The method of claim 4, further comprising configuring a second different test port to be a calibration test port configured with a nominal power-frequency spectrum;
wherein the port-under-test comprises the calibration test port; and
further comprising retaining the inter-symbol interference measurement attributable to the test cable, to the medium dependent interface, and to the diagnostic digital receiver as a calibration.

6. The method of claim 1, wherein configuring the diagnostic digital receiver comprises establishing a predetermined receiver gain;
wherein probing the at least one diagnostic digital receiver signal comprises probing a corrected digital signal and a reproduced digital signal;
wherein processing the at least one probed diagnostic digital receiver signal into a measurement comprises computing power of the corrected digital signal and the reproduced digital signal averaged over a predetermined time interval;
wherein adjusting the measurement to remove from the measurement at least on predetermined power characteristic comprises removing a predetermined noise power level attributable to the diagnostic digital receiver from the corrected digital signal power; and
wherein comparing the adjusted measurement comprises computing a difference between the adjusted corrected digital signal power and the reproduced digital signal power and comparing that difference to the reproduced digital signal power.

7. The method of claim 1, wherein configuring the diagnostic digital receiver comprises:
establishing a predetermined receiver gain;
establishing a predetermined transmitter level;
wherein probing the at least one diagnostic digital receiver signal comprises probing at least one canceller filter coefficient for the at least one wire pair;
wherein processing the at least one probed diagnostic digital receiver signal into a measurement comprises computing power of the at least one canceller filter coefficient averaged over a predetermined time interval;
wherein adjusting the measurement to remove from the measurement at least on predetermined power characteristic comprises:
removing a predetermined canceller filter coefficient power attributable to the test cable, the medium dependent interface, and the diagnostic digital receiver from each probed canceller filter coefficient;
summing power levels from the at least one adjusted canceller filter coefficient; and
wherein comparing the adjusted measurement comprises comparing the adjusted measurement to a predetermined power transmitted to the port-under-test on the wire pair.

8. The method of claim 1 further comprising:
configuring a second different test port to be a calibration test port terminated with a nominal impedance;
connecting the calibration test port as the port-under-test; and
retaining the predetermined power characteristic measurement as a calibration.

9. The method of claim 1 further comprising:
configuring a second different test port to be a calibration test port terminated with a predetermined mismatch impedance;
connecting the calibration test port as the port-under-test;
computing transmit power from the adjusted measurement in combination with a predetermined return loss associated with the predetermined mismatch impedance;
retaining the transmit power as the power transmitted; and
wherein probing the at least one diagnostic digital receiver signal comprises probing at least one echo canceller filter coefficient for at least one wire pair.

10. The method of claim 1, wherein the at least one diagnostic digital receiver signal on the at least one wire pair is an Ethernet signal, the integrated transceiver comprises an Ethernet transceiver, the port-under-test comprises an Ethernet port and the test port and the port-under-test are coupled by an Ethernet patch cable; and
wherein while measurements are performed the Ethernet port-under-test is in a state of one of:
idle transmission; and
transmitting arbitrary packet data.

11. A method to test electrical characteristics of a port-under-test, the method comprising:
establishing a communication link to the port-under-test using a test cable, the test cable connected between the port-under-test and a test port, the test port having an integrated transceiver, a physical layer impairment generator, and a medium dependent interface, the medium dependent interface having a wideband impairment coupler;
generating at least one pre-characterized physical layer impairment;

applying at least one pre-characterized physical layer impairment through the wideband impairment coupler to at least one wire pair of the test cable;

obtaining at least one status indication from the integrated transceiver while maintaining an idle communications link to the port-under-test;

obtaining at least one status indication from the integrated transceiver while transmitting arbitrary packet data to the port-under-test;

analyzing the at least one status indication from the integrated transceiver; and determining disruption of integrity and stability of the communication link caused by at least one pre-characterized physical layer impairment from the at least one status indication.

12. The method of claim 11, wherein applying the at least one pre-characterized physical layer impairment to at least one wire pair comprises at least one of:

applying a predetermined passive line insertion loss replicating a worst case channel insertion loss;

applying an adjustable level of frequency contoured noise, to approximate a nominal power spectrum of transmission signals;

applying an adjustable random transmission symbol timing modulation having a predetermined modulation frequency spectrum; and applying an adjustable symbol frequency offset from nominal symbol rate.

13. The method of claim 11, wherein obtaining the at least one status indication comprises at least one of:

sampling a remote receiver error status indicator; and sampling a link status indicator.

14. The method of claim 11, wherein the integrated transceiver comprises an Ethernet transceiver, the port-under-test comprises an Ethernet port and the test port and the port-under-test are coupled by an Ethernet patch cable; and wherein while measurements are performed the Ethernet port-under-test is a state of
idle Ethernet signal transmission
transmitting arbitrary Ethernet packet data.

15. A system to measure transceiver parameters comprising:

a test port comprising
a microcontroller;
a medium dependent interface in communication with the microcontroller and including a wideband physical layer impairment coupler;
an integrated transceiver in communication with the microcontroller and the medium dependent interface, the integrated transceiver comprising:
a diagnostic digital receiver including a digital differential power detector; and
a transmitter; and
a memory including at least one predetermined power characteristic from at least one of:
a test cable;
the medium dependent interface; and
the diagnostic digital receiver.

16. The system of claim 15, wherein the diagnostic digital receiver further comprises:

an analog front end;
an analog to digital (A/D) converter coupled to the analog front end;
a digital signal correction logic coupled to the A/D converter;
a digital discriminator coupled to the digital signal correction logic; and
wherein the digital differential power detector is coupled to the A/D converter, the digital signal correction logic, and the digital discriminator.

17. The system of claim 15, wherein the test port further comprises at least one of:

a wideband impairment coupler including a passive insertion loss impairment circuit switchably coupled to at least one wire pair; and a wideband impairment coupler including a wideband impedance mismatch circuit switchably coupled to at least one wire pair and wherein the test port functions as a calibration test port; and a frequency contoured noise generator in communication with the microcontroller and coupled to the medium dependent interface; and a timing generator in communication with the microcontroller and coupled to the integrated transceiver.

18. The system of claim 15 further comprising a plurality of test ports having a corresponding plurality of test cable connections linkable to a corresponding plurality of ports-under-test;

a backplane coupled to each of the plurality of test ports;
a controller blade interfacing the backplane to a host computer; and
a trigger bus communicating a trigger signal from the controller blade to the plurality of test ports.

19. The system of claim 15 wherein the test port further comprises a pass-through medium dependent interface switchably connectable to the medium dependent interface;

wherein the integrated transceiver is switchably connectable to the medium dependent interface; and
wherein the medium dependent interface with wideband impairment coupler is coupled to the pass-through medium dependent interface in place of
the integrated transceiver.

20. A computer readable storage medium for tangibly storing thereon computer readable instructions for a method comprising:

establishing a communication link to the port-under-test using a test cable connected between a port-under-test and a test port, having a medium dependent interface (MDI) and an integrated transceiver having a diagnostic digital receiver;

configuring the diagnostic digital receiver;

probing at least one diagnostic digital receiver signal originating from the port-under test over at least one wire pair within the test cable while maintaining the communications link to the port-under test;

processing the at least one probed diagnostic digital receiver signal into a measurement;

adjusting the measurement to remove from the measurement at least one predetermined power characteristic associated with at least one of:
the test cable;
the MDI; and
the diagnostic digital receiver; and comparing the adjusted measurement to a predetermined standard for the port-under-test.

* * * * *